US012641670B2

(12) United States Patent
Wang et al.

(10) Patent No.: US 12,641,670 B2
(45) Date of Patent: May 26, 2026

(54) METHOD AND APPARATUS FOR TRANSMITTING AND RECEIVING INFORMATION

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 18/271,367

(22) PCT Filed: Jan. 7, 2022

(86) PCT No.: PCT/KR2022/000307
§ 371 (c)(1),
(2) Date: Jul. 7, 2023

(87) PCT Pub. No.: WO2022/149910
PCT Pub. Date: Jul. 14, 2022

(65) Prior Publication Data
US 2024/0064852 A1     Feb. 22, 2024

(30) Foreign Application Priority Data
Jan. 8, 2021    (CN) .......................... 202110026339.9

(51) Int. Cl.
*H04W 76/27*        (2018.01)
*H04W 74/0833*      (2024.01)
*H04W 76/30*        (2018.01)

(52) U.S. Cl.
CPC ....... *H04W 76/27* (2018.02); *H04W 74/0833* (2013.01); *H04W 76/30* (2018.02)

(58) Field of Classification Search
CPC ......... H04W 28/0278; H04W 72/1221; H04W 72/1268; H04W 72/21; H04W 72/23;
(Continued)

(56) References Cited

U.S. PATENT DOCUMENTS 8,412,943 B2     4/2013  Pang et al.
10,516,585 B2   12/2019  Parandehgheibi et al.
(Continued)

FOREIGN PATENT DOCUMENTS

EP          4135243 A1  *  2/2023   ............. H04W 72/23
EP          3506708 B1  *  7/2023   ........ H04W 74/0833

OTHER PUBLICATIONS

Lenovo et al., 'Consideration on CG based small data transmission', R2-2009874, 3GPP TSG-RAN WG 2 Meeting #112 electronic, Online, Oct. 23, 2020.
(Continued)

*Primary Examiner* — Nathan S Taylor
(74) *Attorney, Agent, or Firm* — Jefferson IP Law, LLP

(57) ABSTRACT

Embodiment of the present application provides the method comprising receiving a first message and/or transmitting a second message, to transmit a first data based on a resource configuration corresponding to the first message and/or the second message; initiating a random access request message, to transmit the first data request message first data based on the resource configuration. Based on the solutions provided by embodiments of the present disclosure, optimization of the procedure that requires data transmission when the user device is in the first connected status can be achieved.

13 Claims, 15 Drawing Sheets

(58) Field of Classification Search
CPC ..... H04W 72/54; H04W 28/02; H04W 72/12;
H04W 24/08; H04W 28/06; H04W 80/02;
H04W 88/02; H04W 88/08; H04W 92/10;
H04W 72/044; H04W 74/0833; H04W
76/22; H04W 76/27; H04W 76/30; H04W
88/085; H04W 92/12; H04W 72/04;
H04W 74/08; H04W 88/14
See application file for complete search history.

(56) References Cited

U.S. PATENT DOCUMENTS

| | | | | |
|---|---|---|---|---|
| 12,279,332 | B2 * | 4/2025 | Park | H04W 76/30 |
| 2018/0324850 | A1 | 11/2018 | Amura et al. | |
| 2020/0196349 | A1 * | 6/2020 | He | H04W 72/1268 |
| 2021/0274525 | A1 * | 9/2021 | Wei | H04W 76/27 |
| 2021/0337602 | A1 * | 10/2021 | Liu | H04W 28/26 |
| 2022/0022276 | A1 * | 1/2022 | Shih | H04L 5/0094 |
| 2022/0039147 | A1 * | 2/2022 | Lei | H04W 72/54 |
| 2022/0053446 | A1 | 2/2022 | Deng et al. | |
| 2022/0086944 | A1 * | 3/2022 | Kim | H04W 76/34 |
| 2023/0040076 | A1 * | 2/2023 | Kim | H04W 76/30 |
| 2023/0071486 | A1 * | 3/2023 | Zhu | H04W 76/27 |
| 2023/0164773 | A1 * | 5/2023 | Alfarhan | H04W 74/0833 |
| | | | | 370/329 |
| 2023/0180223 | A1 * | 6/2023 | Tseng | H04W 56/001 |
| | | | | 370/329 |
| 2023/0225005 | A1 * | 7/2023 | Park | H04W 76/30 |
| | | | | 370/329 |
| 2023/0262815 | A1 * | 8/2023 | Agiwal | H04W 74/0833 |
| 2024/0040626 | A1 * | 2/2024 | Tseng | H04W 72/542 |
| 2024/0224209 | A1 * | 7/2024 | Lee | H04W 76/30 |
| 2024/0365316 | A1 * | 10/2024 | Alfarhan | H04W 74/0833 |
| 2025/0048336 | A1 * | 2/2025 | Agiwal | H04W 72/04 |

OTHER PUBLICATIONS

Huawei et al., 'Small data transmission with RA-based schemes', R2-2010280, 3GPP TSG-RAN WG2 # 112-e, Online, Oct. 23, 2020.
Vivo, 'Supporting Small Data Transmission via RA Procedure', R2-2008960, 3GPP TSG-RAN WG2 Meeting #112-electronic, Online, Oct. 23, 2020.
LG Electronics Inc., 'Coexistence of CG and RACH configuration for SDT', R2-2009458, 3GPP TSG-RAN2#112-e, Online, Oct. 23, 2020.
3GPP; 3rd Generation Partnership Project; Technical Specification Group Services and System Aspects; Authenication and Key Management for Applications (AKMA); based on 3GPP credentials in the 5G System (5GS) (Release 17); 3GPP TS 33.535 V17.0.0 (Dec. 2020); Dec. 16, 2020; Valbonne, France.

* cited by examiner gNB-CU
(central unit of
base station)

gNB-DU
(distributed unit
of base station)

METHOD AND APPARATUS FOR TRANSMITTING AND RECEIVING INFORMATION

TECHNICAL FIELD

The present application relates to the technical field of communication, and in particular to an information transmission and reception method and apparatus, an electronic device and a storage medium.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DISCLOSURE OF INVENTION

Technical Problem

When the user does not perform data transmission for a long time, the user can enter the Idle, so that the base station and the user will delete all contexts. If the user in the Idle has data to be transmitted, the user then starts the connection establishment procedure and establishes the user context with the base station. In this procedure, the user and the base station need to perform necessary signaling interactions, and at the same time, the user and the base station also need to perform signaling interactions with the entities of the core network. These interaction procedures require a certain amount of time. Therefore, the problem brought by the user in the Idle is that it takes a long time for the user to complete the connection establishment and then perform data transmission, which will inevitably increase delay in communication.

Solution to Problem

Embodiments of the present application provide an information transmission method and apparatus, an electronic device and a storage medium, belonging to the field of wireless communication. The method comprises: receiving a first message and/or transmitting a second message, to transmit a first data based on a resource configuration corresponding to the first message and/or the second message, wherein, the first data is data to be transmitted when a user device is in a first connection status, the first connection status is a non-connected status, transmission of the first data comprises at least one of the followings: transmission of the first data based on the resource configuration; initiating a random access request message, to transmit the first data based on the resource configuration. Based on the solutions provided by embodiments of the present disclosure, optimization of the procedure that requires data transmission when the user device is in the first connected status can be achieved.

BRIEF DESCRIPTION OF DRAWINGS

In order to explain the technical solutions of the embodiments of the present application more clearly, the drawings used in the description of the embodiments of the present application will be briefly illustrated below.

BEST MODE FOR CARRYING OUT THE INVENTION

Figure 1:
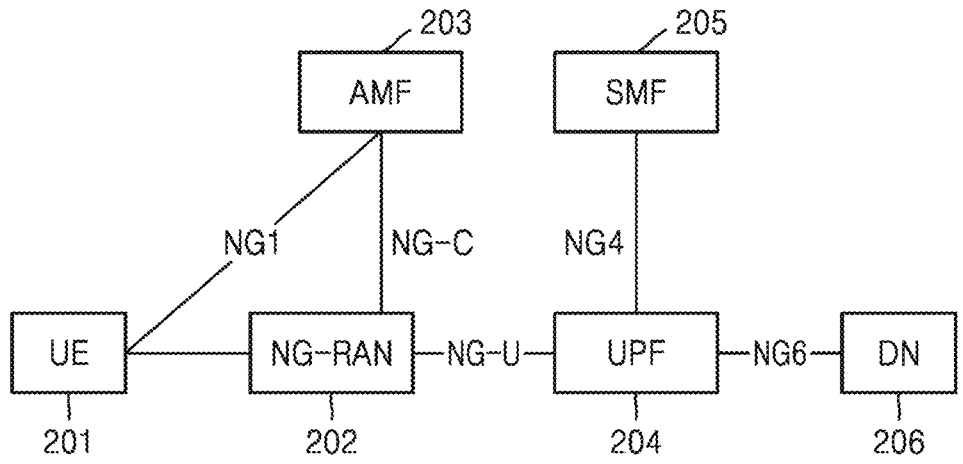
FIG. 1 is a schematic diagram of the architecture of a communication system to which the embodiments of the disclosure are applied.

The purpose of the present disclosure is to solve at least one of the above-mentioned technical defects. The technical solutions provided by the embodiments of the present disclosure are as follows:

In one aspect, the present disclosure provides a data transmission method, comprising at least one of the followings:

before entering a first connection status, acquiring a resource configuration information corresponding to a first data, to transmit the first data based on the resource configuration information after entering the first connection status;

initiating a random access request message, to transmit the first data based on a random access procedure;

wherein, the first connection status is a non-connected status, and the first data is data to be transmitted when a user device is in the first connection status.

In another aspect, the present disclosure provides a data transmission method, comprising:

acquiring a resource configuration information corresponding to a first data, to transmit the first data based on the resource configuration information, and/or, initiating a random access request message, to transmit the first data based on the resource configuration information;

wherein, the first data is data to be transmitted when a user device is in the first connection status, and the first connection status is a non-connected status.

In another aspect, the present disclosure provides a data transmission method, comprising at least one of the followings:

transmitting a resource configuration information corresponding to a first data, to transmit the first data based on the resource configuration information by a user device, and/or, initiating a random access request message, to transmit the first data based on the resource configuration information;

wherein, the first data is data to be transmitted when the user device is in the first connection status, and the first connection status is a non-connected status.

In another aspect, the present disclosure provides a data transmission method, comprising at least one of the followings:

before entering a first connection status by a user device, transmitting a resource configuration information corresponding to a first data to the user device, to transmit the first data based on the resource configuration information after entering the first connection status by the user device;

receiving a random access request message transmitted by the user device, to transmit the first data based on a random access procedure;

wherein, the first data is data to be transmitted when the user device is in the first connection status.

In another aspect, the present disclosure provides an information transmission method, comprising:

receiving a first message and/or transmitting a second message, to transmit a first data based on a resource configuration corresponding to the first message and/or the second message, the first message and the second message including information about the first data, wherein, the first data is data to be transmitted when a user device is in a first connection status, and the first connection status is a non-connected status;

wherein, transmission of the first data comprises at least one of the followings:

transmission of the first data based on the resource configuration;

initiating a random access request message, to transmit the first data based on the resource configuration.

In another aspect, the present disclosure provides an information transmission method, comprising:

transmitting a first message and/or receiving a second message, to transmit a first data based on a resource configuration corresponding to the first message and/or the second message, the first message and the second message including information about the first data, wherein, the first data is data to be transmitted when a user device is in a first connection status, and the first connection status is a non-connected status;

wherein, transmission of the first data comprises at least one of the followings:

transmission of the first data based on the resource configuration;

initiating a random access request message, to transmit the first data based on the resource configuration.

In another aspect, the present disclosure provides a data transmission apparatus, comprising a communication module configured to:

before entering a first connection status, acquire a resource configuration information corresponding to a first data, to transmit the first data based on the resource configuration information after entering the first connection status;

initiate a random access request message, to transmit the first data based on a random access procedure;

wherein, the first connection status is a non-connected status, and the first data is data to be transmitted when a user device is in the first connection status.

In another aspect, the present disclosure provides a data transmission apparatus, comprising a communication module configured to:

acquire a resource configuration information corresponding to a first data, to transmit the first data based on the resource configuration information, and/or, initiate a random access request message, to transmit the first data based on the resource configuration information;

wherein, the first data is data to be transmitted when a user device is in the first connection status, and the first connection status is a non-connected status.

In another aspect, the present disclosure provides a data transmission apparatus, comprising a communication module configured to:

before entering a first connection status, transmit a resource configuration information corresponding to a first data to a user device, to transmit the first data based on the resource configuration information after entering the first connection status by the user device;

receive a random access request message transmitted by the user device, to transmit the first data based on a random access procedure;

wherein, the first data is data to be transmitted when the user device is in the first connection status.

In another aspect, the present disclosure provides a data transmission apparatus, comprising a communication module configured to:

transmit a resource configuration information corresponding to a first data, to transmit the first data based on the resource configuration information by a user device, and/or, initiate a random access request message, to transmit the first data based on the resource configuration information;

wherein, the first data is data to be transmitted when the user device is in the first connection status, and the first connection status is a non-connected status.

In another aspect, the present disclosure provides a data transmission apparatus, comprising a communication module configured to:

receive a first message and/or transmit a second message, to transmit a first data based on a resource configuration corresponding to the first message and/or the second message, the first message and the second message including information about the first data, wherein, the first data is data to be transmitted when a user device is in a first connection status, and the first connection status is a non-connected status;

transmit the first message and/or receive the second message, to transmit the first data based on the resource configuration corresponding to the first message and/or the second message;

wherein, transmission of the first data comprises at least one of the followings:

transmission of the first data based on the resource configuration;

initiating a random access request message, to transmit the first data based on the resource configuration.

In another aspect, embodiments of the present disclosure also provide an electronic device including at least one procedure or configured to execute the method provided in any of optional embodiments of the present disclosure.

In another aspect, embodiments of the present disclosure also provide a computer readable medium storing computer programs thereon, which can achieve the method in any of optional embodiments of the present disclosure upon performing.

The beneficial effects brought by the technical solutions provided by the present disclosure are: in the embodiments of the present disclosure, the information interaction of the data to be transmitted when the user device is in the first connected status (such as Inactive) is achieved through the interaction of messages (a first message and/or a second message) between communication entities in the communication network, thereby optimizing the communication procedure when the user device in the first connected status needs to perform data transmission.

MODE FOR THE INVENTION

The embodiments of the present application will be described in detail below, and the examples of the embodiments are illustrated in the drawings, where throughout the drawings, the same or similar reference numbers are used to depict the same or similar elements or elements having the same or similar functions. The embodiments described below with reference to the drawings are illustrative, and are only used to explain the present application, rather than being construed as limiting the present application.

It should be understood by those skilled in the art that, as used herein, singular forms "a", "an", "the" and "said" may include plural forms, unless otherwise specifically statusd. It should also be understood that the word "include/including" used in the specification of the present application specifies the presence of the status features, integers, steps, operations, elements and/or components, and does not exclude the presence or addition of one or more other features, integers, steps, operations, elements, components, and/or combinations thereof. It should be understood that, when a component is referred to as being "connected to" or "coupled to" another component, this element may be directly connected or coupled to other element, or there may be intervening elements. In addition, the "connection" or "coupling" as used herein may include wireless connection or coupling. As used herein, the word "and/or" includes all or any unit and all combinations of one or more associated listed items.

The technical solutions of the present disclosure and how the technical solutions of the present disclosure solve the above technical problems are described in detail below with specific embodiments. The following specific embodiments can be combined with each other, and the same or similar concepts or procedures may not be repeated in some embodiments. The embodiments of the present disclosure will be described below in conjunction with the accompanying drawings.

In order to meet an increasing demand for wireless data communication services since a deployment of 4G communication system, efforts have been made to develop an improved 5G or pre-5G communication system. Therefore, the 5G or pre-5G communication system is also called "beyond 4G network" or "post LTE system".

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

In the New Radio access (NR) network, the user (user device) has three statuses, namely Connected, Idle and Inactive. The user can perform data transmission with the network only in the Connected. If the user enters Idle or Inactive, the user cannot perform data transmission with the network. When the user does not perform data transmission for a long time, the user can enter the Idle, so that the base station and the user will delete all contexts. If the user in the Idle has data to be transmitted, the user then starts the connection establishment procedure and establishes the user context with the base station. In this procedure, the user and the base station need to perform necessary signaling interactions, and at the same time, the user and the base station also need to perform signaling interactions with the entities of the core network. These interaction procedures require a certain amount of time. Therefore, the problem brought by the user in the Idle is that it takes a long time for the user to complete the connection establishment and then perform data transmission, which will inevitably increase delay in communication.

In order to overcome the above-mentioned problems, an Inactive status (that is, Inactive) is introduced in NR. When the user is in the Inactive status, the base station, user, and core network entities all save the context. When the user has data to be transmitted, the user only needs to initiate the connection resume procedure (this procedure mainly involves the signaling interaction between the user and the base station, eliminating most of the procedures between the user, the base station and the core network), thereby reducing the delay for users to start data transmission and saving users' energy. Therefore, in the NR system, the Inactive is a more useful user status.

In the actual network, the user will need to transmit some periodic or non-periodical data with small or infrequent data volume. In order to achieve this transmission demand, the user in the Inactive need to initiate Radio Resource Control (RRC) Resume procedure, and then transmit these data, and finally return to the Inactive status. In the entire procedure, the transmitted signaling may be far more than the transmitted data, which introduces unnecessary energy consumption and/or signaling overhead. Thus, the existing data transmission methods still need to be improved.

In the actual communication network, the user will transmit some small data (periodic or aperiodic), and the transmission of these data is not very frequent, for example, data traffic of some Instant Messaging Services (such as WeChat, QQ, Heartbeat package, Keep-alive package, push message, etc.), data traffic of wearable device, data traffic of sensor, data traffic of intelligent instrument, etc. In order to transmit such small data, the user can enter the Inactive, which is beneficial to the user to quickly resume communication with the network, so as to transmit the small data. However, in order to achieve this, the user in the Inactive need to firstly initiate a RRC Resume procedure, then transmit these small data, and finally return to the Inactive. In the whole procedure, the transmitted signaling may be far more than the transmitted data. This introduces unnecessary energy consumption and/or signaling overhead. In order to overcome this problem, the present disclosure proposes a data transmission method, which allows users to transmit small data in the Inactive, avoiding some unnecessary signaling overhead and/or energy consumption.

The solutions provided by the embodiments of the present disclosure optimize a procedure that the user device in a specific connection status (which can be referred to as a first connection status, such as the above-mentioned Inactive or Idle, etc.), namely UE (User Device, also referred to as user terminal, user, terminal device, etc.) performs data transmission, and a data transmission method is provided to reduce unnecessary energy consumption and/or signaling overhead of user device and network device (such as base station, base station components or core networks, etc.) in the communication.

Optionally, the first connected status in the embodiment of the present disclosure is a non-connected status, that is, Non-Connected, and the non-connected status may be an idle status or an inactive status (also may be referred to as a deactivated status, an Inactive). Of course, the first connected status can also include other non-connected statuses that may appear in the future. Optionally, the first connection status may also be other statuses in the communication process, such as an abnormal connection status after a link failure occurring. For the convenience of description, some optional embodiments of the present disclosure will be described by taking the first connection status being the inactive status (Inactive) as an example.

In order to better explain and understand the solutions provided by the embodiments of the present disclosure, the principles of the wireless communication system to which the embodiments of the present disclosure are applied are briefly described below with reference to FIGS. 1, 2a and 2b. It should be noted that the following discussed FIGS. 1, 2a and 2b and various optional embodiments used to describe the principles disclosed in the present disclosure are only for illustration and should not be construed as limiting the scope of the present disclosure in any way. Those skilled in the art will understand that the principles of the present disclosure can be implemented in any suitably arranged system or device, that is to say, the solutions provided by the embodiments of the present disclosure can be applied to a variety of wireless communication systems, including but not limited to NR system, LTE system, etc.

FIG. 1 shows a schematic structural diagram of an exemplary system architecture 200 to which various optional embodiments of the present disclosure are applied. A system that can use the system architecture 200 or its modified structure is also belong to system architecture to which the embodiments of the present disclosure are applied.

As shown in FIG. 1, a user device, namely UE 201, is a terminal device used to receive data and/or transmit data. Next Generation Radio Access Network (NG-RAN) 202 is a radio access network, which includes a base station (gNB or gNB connected to a 5G core network (5GC, 5G Core), eNB (also called ng-gNB) connected to the 5GC) that provides a wireless network interface for UE. An Access and Mobility Management Function (AMF) entity 203 is responsible for managing the mobility context and security information of the UE. A User Plane Function (UPF) entity 204 mainly provides functions of user plane. A Session Management Function (SMF) entity 205 is responsible for session management. A Data Network (DN) 206 includes services such as operators, Internet access, and third-party services. The communication interface between the entities is a Next Generation (NG) communication interface, as shown in FIG. 1, a NG1 interface between UE and AMF, a NG-U interface between NG-RAN and UPF, a NG-C interface between NG-RAN and AMF, a NG4 interface between UPF and SMF, and a NG6 interface between UPF and DN.

Figure 2A:
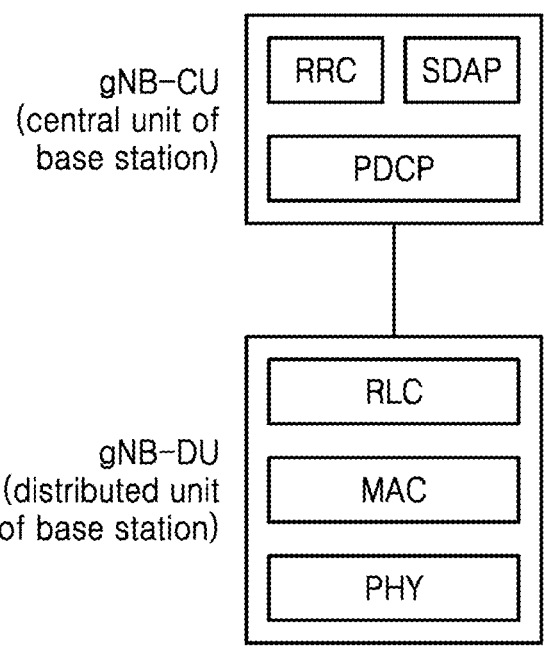
FIG. 2a is a schematic structural diagram of a base station according to an embodiment of the present disclosure.
Figure 2B:
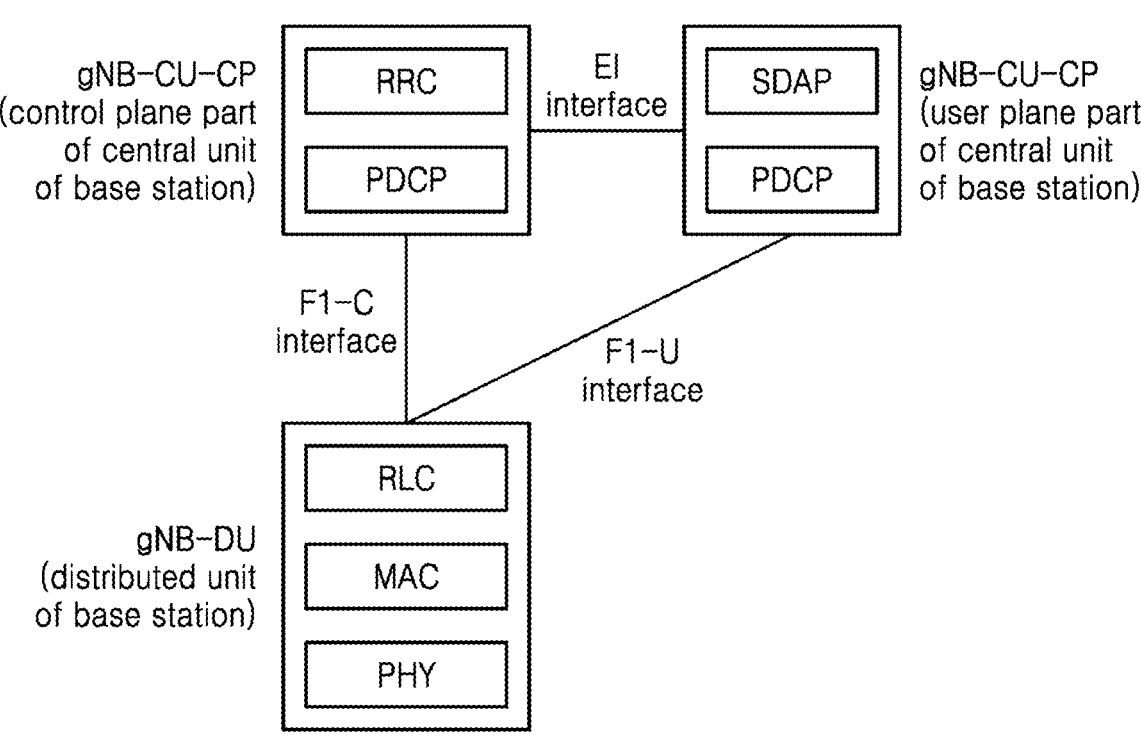
FIG. 2b is a schematic structural diagram of a base station according to an embodiment of the present disclosure.

In the NR system, in order to support network function virtualization and more efficient resource management and scheduling, the base station (such as gNB) that provides wireless network interfaces for UE can be further divided into gNB central unit (gNB-CU) and gNB distributed unit (gNB-DU) (gNB-CU and gNB-DU are referred to as CU and DU respectively in this disclosure), as shown in FIG. 2a. The CU has a Radio Resource Control (RRC) layer, a Service Data Adaptation Protocol (SDAP) layer, and a Packet Data Convergence Protocol (PDCP) layer, etc. The DU has a Radio Link Control (RLC) protocol layer, a Media Access Control (MAC) layer, and a Physical (PHY) layer, etc. A standardized public interface F1 is between CU and DU. As shown in FIG. 2b, the F1 interface is divided into a control plane F1-C interface and a user plane F1-U interface. A transmission network layer of the F1-C interface performs transmission based on Internet Protocol (IP). In order to transmit signaling more reliably, a Stream Control Transmission Protocol (SCTP) is added to IP. A protocol of the application layer is F1 Application Protocol (F1AP), see 3GPP TS38.473. SCTP can provide reliable application layer message transmission. A transmission layer of F1-U is a User Datagram Protocol (UDP)/IP, GPRS Tunnel Protocol-User (GTP-U) is used to carry the User Plane Protocol Data Unit (PDU) on the UDP/IP. Further, as shown in FIG. 2b, gNB-CU may include gNB-CU-Control Plane (gNB-CU-CP, the control plane part of the central unit of the base station, which may also be referred to as the control plane entity of the central unit) and gNB-CU-User Plane (gNB-CU-UP, the user plane part of the central unit of the base station, which can also be referred to as the user plane entity of the central unit). gNB-CU-CP includes functions of the control plane of the base station, and has RRC and PDCP protocol layers. gNB-CU-UP includes functions of the user plane of the base station, and has SDAP and PDCP protocol layers. A standardized public interface E1 is between gNB-CU-CP and gNB-CU-UP, that is, the interface E1 shown in the figure, and the protocol is E1 Application Protocol (E1AP), see 3GPP TS38.463. The interface between the control plane part of the central unit of the base station and the distributed unit of the base station is the F1-C interface, that is, the control plane interface of F1, and the interface between the user plane part of the central unit of the base station and the distributed unit of the base station is the F1-U interface, that is, the user plane interface of F1.

In the NR system, the user entering the Inactive needs to start a RRC Resume procedure to perform data transmission. The RRC Resume procedure may occur in the base station connected when the user enters the Inactive (referred to as the last serving base station in this disclosure), or may occur in other base stations (referred to as the serving base station in this disclosure) different from the last serving base station. For the former, because the serving base station has not changed, the user can quickly change from the Inactive to the connected status, and then perform data transmission. For the latter, because the base station to which the user is connected has changed, the serving base station needs to perform the user context fetch procedure with the last serving base station. If the procedure is successful, the user can perform data transmission with the serving base station. If the fetch is not successful, the user is unable to transmit data. Under the current mechanism, if the user in the Inactive has data to be transmitted, the user can only enter the connected status firstly. However, for some small data (such as data whose data packets are small and the data packets are not transmitted very frequently), the signaling overhead introduced by the user entering the connected status is likely to be more than the transmitted small data, which causes unnecessary signaling overhead while increasing the energy consumption of the user terminal. This is an inefficient method of data transmission and needs to be improved.

In view of the problems existing in the foregoing transmission methods, in order to solve at least one of these problems to improve the transmission of small data, the present disclosure provides a data transmission method. The data to be transmitted by the data transmission method of the present disclosure may include small data or data that is not small data. That is to say, the solution of the embodiment of the present disclosure can be applied to the transmission of data that meets certain conditions (such as small data), or the transmission of any form of user data. The user data can be an uplink data and/or a downlink data. That is, the data can be transmitted to or transmitted by the user device. In the various embodiments described below, some descriptions are based on small data as an example, but it is understandable that it can also be user data in any form.

Small data refers to data that has a small amount of data volume (for example, the amount of data volume is less than or equal to a certain threshold) and/or data that is not frequently transmitted, etc. The small data can be transmitted periodically or non-periodically. Optionally, the user data (a first data) that needs to be transmitted and involved in the present disclosure may include small data, wherein the small data may refer to data that meets at least one of the following:

data whose size of the data packet is less than or equal to a first size;

data whose transmission period is less than or equal to a first period;

a first type of data.

That is, small data can be defined as data that meets one or more of the above conditions. The above-mentioned first type may be one type, or one or more of multiple types. For example, small data may include at least one of the following multiple types of data:

the data traffic of instant messaging service, the data traffic of wearable device, the data traffic of sensor, and the data traffic of intelligent instrument.

In order to solve at least one of the problems existing in the existing data transmission methods, the data transmission method provided in the embodiments of the present disclosure may include at least one of the followings:

before entering a first connection status, acquiring a resource configuration information corresponding to a first data, to transmit the first data based on the resource configuration information after entering the first connection status;

initiating a random access request message, to transmit the first data based on a random access procedure;

wherein, the first connection status is a non-connected status, and the first data is data to be transmitted when a user device is in the first connection status.

As can be seen from the foregoing description, the first connection status can be an inactive status, an idle status, or other abnormal connection statuses (for example, after a link failure occurring), and the first data can be any data (i.e., uplink data) that is required to be transmitted or any data (i.e., downlink data) that is required to be received when the user device is in the first connection status, and the first data may include but is not limited to the above small data.

As an optional implementation of the data transmission method provided by the present disclosure (method one, using pre-configured resources for data transmission, which may be referred to as Configured Grant-small data (such as small data) transmission), the user device can pre-acquire the resource configuration information corresponding to the first data before entering the first connection status. The resource configuration information can include configuration information corresponding to the uplink data and/or configuration information corresponding to the downlink data. After entering the first connection status, if the user device needs to transmit data and/or receive data, it may perform corresponding data reception and/or transmission based on the pre-acquired resource configuration information.

As another optional implementation of the data transmission method provided by the embodiment of the present disclosure (method two, data transmission based on random access), when the user device in the first connected status needs to perform data transmission, a random access request may be initiated, and the user device realizes data transmission with the base station based on the random access procedure of the user device.

It should be noted that the above two optional implementations provided by the present disclosure can be implemented separately or in combination. For example, the communication protocol stipulates the use of method one or method two, or stipulates the use of method one in certain scenarios, and the use of method two in some scenarios. Optionally, the resource configured by the above resource configuration information may be the resource of the serving cell in which the user device is located before entering the first connected status, and the base station to which the user device is connected before entering the first connected status configures the resource configuration information for the user device. If the serving cell where the user device is located at this time is the same as the serving cell (after entering the first connected status) when the first data needs to be transmitted, that is, the serving cell has not changed, the user device can realize the rapid transmission of data based on the resource configuration information. If the serving cell of the user device before entering the connected status is different from the serving cell when the first data needs to be transmitted, the user device can use the data transmission method based on the random access procedure to perform the transmission of first data.

The specific method in which the user device implements transmission of the first data based on the foregoing resource configuration information and/or based on the random access procedure is not limited in the embodiment of the present disclosure. For example, the user device may transmit data to the base station and/or receive data transmitted by the base station directly or in other prescribed methods based on the pre-acquired resource configuration informationtion. For another example, when the user device performs data transmission based on the random access procedure, the data transmission is performed during the RRC Resume procedure or after the RRC Resume procedure.

In an optional embodiment of the present disclosure, transmission of the first data in above may include: transmitting a RRC Resume request message, and transmission of the first data based on the RRC Resume procedure.

Optionally, when the user device transmits the first data based on the random access procedure, the data transmission may be implemented in the procedure of initiating the RRC Resume. Optionally, in the procedure of transmission of the first data based on the RRC Resume procedure, whether the RRC connection is successfully resumed is not limited in the embodiments of the present disclosure, for example, it may be after the RRC connection is successfully resumed, or before the RRC connection is successfully resumed, or it may be RRC Resume failed. That is to say, in an optional embodiment of the present disclosure, even if the RRC connection resume fails, the data transmission may be performed at the same time as, before, or after the RRC Resume request message is transmitted.

Optionally, transmitting the RRC Resume request message and transmission of the first data based on the RRC Resume procedure in above may include at least one of the followings:

transmitting the RRC Resume request message and the first data at the same time;

transmitting the RRC Resume request message and the first data separately;

transmission of the first data after transmitting the RRC Resume request message;

transmitting the RRC Resume request message and receiving the first data.

When the user device is in the first connection status, in order to perform data transmission, a RRC Resume request message is required to be initiated, that is, an RRC Resume procedure is required to be initiated to try to re-establish a connection with the base station. In this procedure, the user device performs necessary signaling interaction with the base station. Based on this, the user device can transmit the RRC Resume request message and the data to be transmitted to the base station at the same time, or transmit the RRC Resume request message and the data to be transmitted to the base station separately, of course, transmission of the first data after transmitting the RRC Resume request message is also feasible. Optionally, when the user device is trying to establish a connection with the base station, the base station may transmit data that needs to be transmitted to the user device to the user device.

The above describes the data transmission method provided by the present disclosure from the perspective of user device as the execution object. Correspondingly, the execution object of the data transmission method may also be a network node, such as a base station, a central unit of base station, and a control plane entity or a user plane entity of the central unit of base station, a distributed unit of base station, where the base station may be a first base station or a second base station in the following. When the execution object is a network node, the data transmission method may include at least one of the followings:

before entering a first connection status by a user device, transmitting a resource configuration information corresponding to a first data to the user device, to transmit the first data based on the resource configuration information after entering the first connection status by the user device;

receiving a random access request message transmitted by the user device, to transmit the first data based on a random access procedure.

It is clear to those skilled in the art that the essence of the data transmission method with the network node as the executive object and the data transmission method with the user device as the executive object are the same, and are described separately from the two terminals of the data interaction. For concise illustration, the method on the network node side will not be further explained here.

In the solution provided by the present disclosure, the user, that is, the user device, can perform data transmission in the above two methods. The following takes the data to be transmitted including small data (may also be other data) as an example for illustrating optional implementation of these two transmission methods in detail, as follows:

Method 1: Using Pre-Configured Resources for Small Data Transmission

In this method, when the network configures the user to enter the Inactive, some resources can be configured for the user. If the user in the Inactive has data to be transmitted, the pre-configured resources are used for data transmission. In an optional implementation, the pre-configured resources may be the resources in the cell to which the user is connected before entering the Inactive. In another optional implementation, the resources are the resources in the cell (the cell may be different from the cell to which the user is connected before entering the Inactive) where the user performs small data transmission.

Optionally, when the base station configures the user to enter the Inactive (that is, before the user device entering the Inactive), the base station pre-configures the resources of the cell in which the user device is currently located to the user device. If the user device needs to transmit data after entering the Inactive and the cell in which the user device is located at this time is still the cell before entering the Inactive, the data transmission can be realized based on the pre-acquired resources of the cell. If the cell in which the user device is located at this time is not the cell before entering the Inactive, other methods (such as based on random access method) are employed to achieve the data transmission. Optionally, when the base station configures the user to enter the Inactive, the resources of other cells are pre-configured to the user device, wherein, other cells are cells to which the user device may connect for transmitting data after entering the Inactive, for example, may be the cell in which the user device locates or one or more cells adjacent to the cell in which the user device locates, or may be cell determined based on other prescribed regulation, so that the cell in which the user device locates upon transmitting data belongs the above other cells, the data transmission may be performed based on the sources pre-configured by the base station for the cell. Currently, if the cell in which the user device locates upon transmitting data is not the cell in which the user device locates upon entering the Inactive, the user device can synchronize with the cell in which the user device locates at this time and realize data transmission based on the pre-configured resources.

In the method 1, the small data can be transmitted at the same time as the RRC Resume request message, or transmitted separately, or after transmitting the RRC Resume request message. In addition, the user can transmit and/or receive one or more small data packets.

The advantage of the method 1 is that the user can transmit data on the resources that have been configured, without requesting resources from the network (and/or without synchronizing with the network, because the user still maintains synchronization with the network side), thus quickly performing the transmission of small data. In the present disclosure, this method may be referred to as Configured Grant-small data transmission (CG-SDT), and the small data transmitted in this method may be referred to as Configured Grant-small data.

It should be noted that the name of many technical term in this disclosure is just example, and other names can also be used. This disclosure does not limit this. For example, other names can also be used to represent small data transmission based on this method. The data transmitted in this method (such as the above-mentioned small data) can also adopt other names.

Optionally, a typical application scenario of the above method 1 is that the user in the Inactive (that is, the user device in the Inactive) still performs the transmission of small data in the cell connected before entering the Inactive (may be referred to as the last serving cell), so that the base station can pre-configure some resources for the user. In this scenario, because the serving cell of user has not changed, the user may still be synchronized with the network, so the user can directly transmit small data. Of course, the present disclosure does not exclude other application scenarios.

Method 2: Small Data Transmission Based on Random Access

In this method, if the user has small data to be transmitted, the user needs to initiate a random access procedure, and the user can only transmit the small data after the procedure being successful. In an optional implementation, the random access procedure may occur in the cell (last serving cell) to which the user is connected before entering the Inactive. In another optional implementation, the random access procedure may occur in a different cell (new cell) from the last serving cell. In the method 2, the small data can be transmitted at the same time as the RRC Resume request message, or sent separately, or after the RRC Resume request message being transmitted. In addition, the user can transmit and/or receive one or more small data packets.

The advantage of the method 2 is that when the user moves to a cell different from the last serving cell, the user can synchronize with the network through a random access procedure and initiate the transmission of small data. In the present disclosure, this method can be referred to as Random access-small data transmission (RA-SDT), and the small data transmitted in this method can be referred to as Random access-small data. Similarly, these names are only exemplary, and other names can also be used to represent the transmission of small data and/or the small data transmitted in this method.

A typical application scenario of the above method 2 is: the user in the Inactive enters a cell (new cell) different from the cell (last serving cell) connected before entering Inactive, before the transmission of small data, the user is synchronized with the new cell firstly, and then perform the transmission of small data. Of course, the present disclosure does not exclude other application scenarios.

In order to support the data (such as small data) transmission in above two methods, some signaling interactions may be inside the base station (such as between the central unit and the distributed unit of the base station, between control plane part of the central unit and the user plane part of the central unit, etc.), between different base stations as well as between the base station and the user. The present disclosure provides methods for signaling interactions and defines the information contained in each signaling.

It should be noted that, regardless of whether the above-mentioned method 1 or method 2 is adopted, the optional embodiments of the information transmission method provided in the following of present disclosure can be applied to the method 1 or the method 2.

Optionally, when the data transmission method of the present disclosure is executed by the user device, the data transmission method provided by the present disclosure may include:

acquiring a resource configuration information corresponding to a first data, to transmit the first data based on the resource configuration information, and/or, initiating a random access request message, to transmit the first data based on the resource configuration information.

Optionally, when the data transmission method of the present disclosure is executed by a network node, the method provided by the present disclosure may include at least one of the followings:

transmitting a resource configuration information corresponding to a first data, to transmit the first data based on the resource configuration information by a user device, and/or, initiating a random access request message, to transmit the first data based on the resource configuration information;

wherein, the first data is data to be transmitted when the user device is in the first connection status, and the first connection status is a non-connected status.

In order to better describe the optional embodiments provided in the present disclosure, the following firstly describes some technical terms that may be involved in the present disclosure. It is understandable that the nouns of various messages, various information and other terms involved in the embodiments of the present disclosure are all exemplary, and other message/information names may also be used. "First", "Second", etc. containing in the name of each message/information are just examples of messages/information, and do not represent the order of execution. In addition, it should be noted that, in addition to the optional steps described in this document, the optional embodiments provided in the present disclosure may or can include other necessary communication steps. In the description of the present disclosure, a detailed description of some steps that are not related to the improvement on the method of the present disclosure may be omitted, which is clear to those skilled in the art.

In the present disclosure, the base station may be a 5G base station (such as gNB) or a 4G base station (such as eNB), may be a base station with a separate structure, or may not be a base station with a separate structure, or may be another type of access node.

In the present disclosure, small data refers to data whose data packets are small and the data packets are not transmitted very frequently. Optionally, the definition of the small data can refer to the description of the small data in the previous section.

In the present disclosure, Small Data Bearer refers to a radio bearer that carries small data. Optionally, the radio bearer is a radio bearer that allows a user to perform data transmission in the Inactive.

In this disclosure, Small Data Protocol Data Unit session refers to a PDU session that carries small data. In one embodiment, the PDU session is a PDU session that allows the user to perform data transmission in the Inactive.

In this disclosure, Small Data Quality of Service flow refers to a QoS flow that carries small data. Optionally, the QoS flow is a QoS flow that allows the user to transmit data in the Inactive.

In the present disclosure, Configured Grant small data/Small Data Bearer/Small Data Protocol Data Unit session/Small Data Quality of Service flow indicates that the user performs data transmission according to the above-mentioned method 1.

In the present disclosure, Random access-small data/Small Data Bearer/Small Data Protocol Data Unit session/Small Data Quality of Service flow indicates that the user performs data transmission according to the above-mentioned method 2.

In the present disclosure, the QoS information indicates the parameter configuration of the QoS of the data, and the information defines information about at least one of the following QoS parameters (for details, referring to TS38.413, TS38.423, TS38.473, etc.):

QoS Priority level;

Packet Delay Budget;

Packet Error Rate;

5G QoS Identifier;

Delay Critical;

Averaging Window;

Maximum data burst volume;

Configuration and Retention Priority;

Guaranteed Bit Rate (GBR) QoS flow information, such as Maximum Flow Bit Rate Uplink/Downlink, Guaranteed Flow Bit Rate Uplink/Downlink, Maximum Packet Loss Rate Uplink/Downlink;

Reflective QoS Attribute.

In this disclosure, the transmission of data refers to the reception and/or transmission of data, and the data to be transmitted refers to the data to be transmitted and/or the data to be received, that is, the data to be transmitted may be uplink data, and may also be downlink data.

In the present disclosure, the transmission of small data occurs after the user entering the Inactive, but in an actual system, the method in the present disclosure is also applicable to the transmission of small data upon the user entering other statuses, such as the Idle, and after the link failure occurring, that is, the first connection status may be Inactive, Idle or other abnormal connection status.

The above descriptions of the technical terms involved in the present disclosure basically use small data as an example. In an actual system, the above descriptions of the terms related to "small data" in the present disclosure are also applicable for other data, for example, the above description of Small Data Bearer can be applied to any data. Data Bearer refers to a radio bearer that carries the data. Optionally, the radio bearer is a radio bearer that allows the user to perform data transmission in the Inactive, the description of other terms is also applicable to any data. Optionally, the description of other terms is applicable to any data that the user device transmits in the first connection status.

The network nodes involved in the embodiments of the present disclosure are as following.

A first node: this node can be a base station, a central unit (CU) of a base station, or a control plane part of a central unit of a base station (CU-CP, which can also be called a control plane entity of a central unit). In an embodiment, the first node may be the central unit of a first base station, the first base station may be the last serving base station for user. Further, the first base station may be a serving base station for user upon the user entering the Inactive (also before the user entering the Inactive). In another embodiment, the first node may be a central unit of a second base station, and the second base station may be a serving base station for user. Further, the second base station may be a base station where the user transmits small data, and/or transmits the RRC Resume request message, and/or transmits the random access request message.

A second node: the node may be a base station or a distributed unit (DU) of a base station. In one embodiment, the second node may be a distributed unit of the first base station, and the first base station is last serving base station (last serving BS) for user. Further, the first base station may be a serving base station for user upon the user entering the Inactive. In another embodiment, the second node may be a distributed unit of the second base station. The second base station may be a serving base station (serving BS) for user. Further, the second base station may be a base station where the user transmits small data, and/or transmits the RRC Resume request message, and/or transmits the random access request message.

A third node: the node may be the above-mentioned first base station. In one embodiment, the third node may be last serving base station (last serving BS) for user. Further, the first base station may be a serving base station for user upon the user entering the Inactive. When the base station includes a central unit and a distributed unit, the third node may be the central unit of the first base station, or the control plane part of the central unit of the first base station, or the user plane part of the central unit of the first base station (also called as the user plane entity of the central unit).

A fourth node: the node may be the above-mentioned second base station. In one embodiment, the fourth node is a serving base station (serving BS) for user. Further, the second base station may be a base station where the user transmits small data, and/or transmits the RRC Resume request message, and/or transmits the random access request message. When the base station includes a central unit and a distributed unit, the fourth node may be the central unit of the second base station, or the control plane part of the central unit of the second base station, or the user plane part of the central unit of the second base station.

A fifth node: this node is a node on the core network side, such as an AMF or other core network entities.

In the actual system, the last serving BS (last base station/previous base station/last serving base station/previous serving base station) and serving BS (current serving base station/current base station/new base station) of the user (that is, user device) may be the same network node, and the third node and the fourth node may be the same node.

In various optional implementations of the present disclosure, various information may be involved, and these information includes a lot of configuration information, indication information, and other information, etc., which may be interacted in multiple procedures. In order to avoid repeated descriptions, the contents contained in these information are introduced as following (it should be noted that although the contents contained in some information (such as configuration information) are introduced separately below, these content is still included in the newly designed information in this disclosure).

1) Data Configuration Information

The data can be the data carried by the Data Radio Bearer (DRB), the data carried by the Signaling Radio Bearer (SRB), or the data of PDU session, or may be the data of QoS flow. In one embodiment, the data may be small data. In another embodiment, the data may be Random access-small data. In another embodiment, the data may be Configured Grant (permission) small data. The function of transmitting this information between nodes is to help the node to configure data transmission. The information indicates/provides the configuration related to the data to be transmitted, and/or is used to request the configuration related to the data to be transmitted. The information can include at least one of the following information:

Identity information of radio bearer, which indicates the identity of the radio bearer that carries the aforementioned data (such as small data), such as the DRB ID of the data radio bearer, and the SRB ID of the signaling radio bearer;

Index information of radio bearer, which indicates the index of the radio bearer that carries the aforementioned data (such as small data). This information is different from the aforementioned identity information of radio bearer, but the index information can indicate a radio bearer;

Quality of Service (QoS) information of the radio bearer, which indicates the QoS of the radio bearer that carries the aforementioned data (such as small data);

Identity information of the PDU session, which indicates the identity of the PDU session (the PDU session to which the data belongs) corresponding to the aforementioned data (such as small data), such as PDU Session ID;

Index information of the PDU session, which indicates the index of the PDU session corresponding to the above-mentioned data. This information is different from the identity information of the above-mentioned PDU session, but the index information can indicate a PDU session;

QoS information of the PDU session, which indicates the QoS of the PDU session corresponding to the above-mentioned data;

Identity information of the QoS flow, which indicates the identity of the QoS flow (the QoS flow to which the data belongs) corresponding to the above-mentioned data, such as QoS Flow ID;

Index information of the QoS flow, which indicates the index of the QoS flow to which the data belongs. This information is different from the identity information of the above QoS flow, but the index information can indicate a QoS flow;

QoS information of the QoS flow, which indicates the QoS of the QoS flow to which the data belongs;

Identity information of the logical channel, such as logical channel ID, which indicates the logical channel used for data transmission;

Identity information of the logical channel group, such as logical channel group ID, which indicates the logical channel group to which the data belongs;

Indication information of data type, which indicates the type of data to be transmitted, and may indicate at least one of the following types:

Small data;

Random Access-small data;

Configured Grant-small data;

Non-small data;

Indication information of configuration request, wherein the function of the indication information is to request the receiving node to provide the transmitting node with configuration information related to the above data;

Configuration information of PDCP, wherein the function of the information is to provide the receiving node with the configuration of the PDCP layer of the above data;

Configuration information of RLC, wherein the function of the information is to provide the receiving node with the configuration of the RLC layer of the above data;

Configuration information of the logical channel, wherein the function of the information is to provide the receiving node with the relevant configuration of the logical channel used to transmit the above data.

2) Indication Information of Small Data

This information is used to indicate information related to small data, and the function of which is to inform the receiver (i.e., the receiving node) of the data packets belonging to the small data, that is, which or what kind of data packets belong to the small data packets. In one embodiment, the function of this information is to indicate the radio bearer of small data (data radio bearer and/or signaling radio bearer), or the PDU session of small data, or the QoS flow of small data, or the logic channel that carries small data, or the logical channel group that carries small data, etc. It can be understood that the above descriptions of radio bearer of small data and PDU session of small data refer to radio bearer that carries small data and PDU session corresponding to small data, respectively. In another embodiment, the function of the information may also be to implicitly request the receiver to provide the configuration information of the small data indicated by the indication information, and the information may include at least one of the following information:

Identity information of small data, such as Small Data bearer ID (SDT bearer ID), Small Data PDU session ID (SDT PDU Session ID), Small Data QoS flow ID (SDT QoS flow ID), Small Data Logical Channel ID (SDT Logical Channel ID), Small Data Logical Channel Group ID (SDT Logical Channel Group ID), etc., where the small data bearer can be DRB or SRB;

Identity information of random access small data, such as Random Access Small Data bearer ID (RA-SDT bearer ID), Random Access Small Data PDU session ID (RA-SDT PDU session ID), Random Access Small Data QoS flow ID (RA-SDT QoS flow ID), Small Data Logical Channel ID (SDT Logical Channel ID), Small Data Logical Channel Group ID (SDT Logical Channel Group ID) etc.;

Identity information of configured grant small data, such as Configured Grant Small Data bearer ID (CG-SDT bearer ID), Configured Grant Small Data PDU session ID (CG-SDT PDU session ID), Configured Grant Small Data QoS flow ID (CG-SDT QoS flow ID), Small Data Logical Channel ID (SDT Logical Channel ID), Small Data Logical Channel Group ID (SDT Logical Channel Group ID), etc.

It should be noted that the names (including Chinese and English names) of the above-mentioned various identity information are illustrative and not unique, and other names may also be used.

3) Configuration Information Related to the Tunnel

The function of the information is that the transmitter (transmitting node) provides the receiver with the relevant configuration of the tunnel (the tunnel for transmitting the data to be transmitted) related to the data to be transmitted (such as small data). Optionally, the function of the information is: the transmitter (transmitting node) informs the receiver of the tunnel information used by the transmitter when transmitting data, and/or the transmitter informs the receiver of the tunnel information used by other nodes (other nodes related to the data to be transmitted different from the transmitter and the receiver) when transmitting data. The information can include at least one of the following information:

Identity information of radio bearer, which indicates the identity of the radio bearer corresponding to the tunnel related to the data to be transmitted. In one embodiment, the radio bearer is a small data radio bearer. In another embodiment, the radio bearer is a random access small data radio bearer. In another embodiment, the radio bearer is a configured grant small data radio bearer;

Identity information of PDU session, which indicates the identity of the PDU session corresponding to the tunnel related to the data to be transmitted. In one embodiment, the PDU session is a small data PDU session. In another embodiment, the PDU session is a random access small data PDU session. In another embodiment, the PDU session is a configured grant small data PDU session;

Identity information of QoS flow, which indicates the identity of the QoS flow corresponding to the tunnel related to the data to be transmitted. In one embodiment, the QoS flow is a small data QoS flow. In another embodiment, the QoS flow is a random access small data QoS flow. In another embodiment, the QoS flow is a configured grant small data QoS flow;

Identity information of logical channel, which indicates the identity of the logical channel corresponding to the tunnel related to the data to be transmitted. In one embodiment, the logical channel is a small data bearer (or small data PDU session, or small data QoS flow) logical channel. In another embodiment, the logical channel is a random access small data bearer (or small data PDU session, or small data QoS flow) logical channel. In another embodiment, the logical channel is a configured grant small data bearer (or small data PDU session, or small data QoS flow) logical channel;

Identity information of logical channel group, which indicates the identity of the logical channel group corresponding to the tunnel related to the data to be transmitted. The logical channel group may include one or more logical channels. In one embodiment, the logical channel group is a small data bearer (or small data PDU session, or small data QoS flow) logical channel group. In another embodiment, the logical channel group is a random access small data bearer (or small data PDU session, or small data QoS flow) logical channel group. In another embodiment, the logical channel group is a configured grant small data bearer (or small data PDU session, or small data QoS flow) logical channel group;

Tunnel information, that is, information related to the tunnel related to the data to be transmitted. Optionally, for a tunnel, the information may at least include a transmission layer address (such as IP address) and/or a tunnel endpoint identifier (TEID, tunnel endpoint ID) of tunnel.

4) Low Layer Configuration Information

The function of this information is to provide the receiver with configuration information related to the data. The difference from "1) the configuration information of the data" mentioned above is that the configuration information of the above data can be the configuration information related to a certain or some of the data packets to be transmitted, and the low layer configuration information is common configuration information. In an embodiment, the configuration information is related to all data (all radio bearers, or all PDU sessions, or all QoS flows, etc.). In another embodiment, the configuration information is configuration information related to small data bearers (or small data PDU sessions, or small data QoS flows, etc.). In another embodiment, the configuration information is configuration information related to random access small data bearer (or small data PDU session, or small data QoS flow, etc.). In another embodiment, the configuration information is configuration information related to configured grant small data bearer (or small data PDU session, or small data QoS, etc.). The low layer configuration information may include at least one of the following information:

At least one of configuration information contained in CellGroupConfig

At least one of the configuration information carried by the RLC (such as RLCBearerConfig), the information may include at least one of the following information:

RLC configuration information

Configuration information of logical channel

Identity information of logical channel

Bearer identity information

RLC configuration information

Configuration information of logical channel

The content contained in the above information can refer to the definitions in TS38.331 or TS36.331. The manner in which the transmitting node transmits the above-mentioned "low layer configuration information" to the receiving node is not limited in the embodiments of the present disclosure. Optionally, in one embodiment, the information contained in the "low layer configuration information" may be transmitted to the receiving node in one RRC container. In another embodiment, the information contained in the above-mentioned "low layer configuration information" may be transmitted to the receiving node in one or more information elements.

5) Configuration Information Related to Configured Grant (Permission)

The function of this information is to configure resources (such as uplink resources, for example, Physical Uplink Shared Channel (PUSCH)) used by data to be transmitted (such as small data), and the information may at least include one of the following information:

Identity information of configuration, configID, which indicates the identity of the configuration used by transmitting the data to be transmitted. The information may indicate a combination of one or more of information, for example, may indicate one or more of the granted start time parameter information in the following, the information about the number of occasion for grant, and the setting information of the granted time alignment timer. In other words, each configID can correspond to a set of configurations.

Configured grant start time parameter information, which indicates the position information for configured grant, that is, the pre-configured indication information of the time domain resource used to transmit the data to be transmitted, and the information is at least include one of the following information:

Period and/or offset information, which indicates the period and/or offset (offset relative to a time starting point, an example of the time starting point may be: relative to the following "starting system frame number" and/or "starting subframe information" and/or "least significant bit (LSB) of superframe corresponding to last subframe of the first transmission of the RRC Release message/RRCConnectionRelease message containing configured grant configuration information") for configured grant (resource for configured permission, that is, configured resource for transmitting data to be transmitted);

Starting System Frame Number (SFN) information, which indicates the starting system frame number for transmitting the data to be transmitted;

Starting subframe information, which indicates the starting subframe for transmitting the data to be transmitted;

LSB of H-SFN (Hyper-SFN) corresponding to the last subframe of the first transmission of RRCRelease message/RRCConnectionRelease message containing configured grant configuration, can be named hsfn-LSB-Info;

Information about number of occasion for configured grant, which indicates the number of occasions for configured grant. In one example, the information indicates the number of occasions for configured grant within a certain period of time, that is, the number of available resources within a certain period of time. For example, the period of the configured resource (that is, for configured grant) is duration A, and the number of occasions for configured grant in duration B is 10, which means that the available resources are allowed to be used 10 times as the maximum number in duration B, and the period of the available resources is duration A;

Setting information of time alignment timer for configured grant, which indicates the valid time of the configuration information included in the "configuration information related to configured grant (permission)";

Radio Network Temporary Identifier (RNTI) information for configured grant, which indicates the identity information used to read the scheduling information for configured grant. In one example, if the user receives the scheduling information containing the identity information (such as Downlink Control Information carried by PDCCH), the resource indicated in the scheduling information is the resource corresponding to configured grant;

Frequency hopping configuration information of Physical Downlink Share Channel (PDSCH) for configured grant, which indicates the frequency hopping configuration employed by the PDSCH in the resource corresponding to configured grant;

Configuration information of Physical Uplink Control Channel (PUCCH) for configured grant, which indicates the configuration of the PUCCH in the resource corresponding to configured grant;

Configuration information of PUSCH for configured grant, which indicates the configuration of the PUSCH in the resource corresponding to configured grant;

Implicit Release After configuration information for configured grant, which indicates how to release configured grant. In one embodiment, the information indicates that the number of occasion for configured grant can be skipped upon the implicit release for configured grant;

UL Grant Information for configured grant, which indicates UL grant configuration information of the resource configured to transmit data to be transmitted.

The information contained in the above "Configuration information related to configured grant" can refer to the PUR-Config in TS36.331, or refer to the cell of configuration information for configured grant defined in TS38.331 (such as ConfigGrant-Config, CGrant-Config, etc.). In one embodiment, the above "configuration information related to configured grant" can be transmitted to the receiving node as a RRC container, or can be transmitted to the receiving node as one or more cells. In addition, the above "configuration information related to configured grant" can be obtained by the transmitting node from other nodes.

6) Information Related to the Carried Data

The information indicates information related to the data transmitted by the user. The information may carry the data transmitted by the user and/or the relevant indication information of the data transmitted by the user. The data transmitted by the user may have one or more different data packets (such as small data packets, random access-small data packets, small data packets for configured grant, non-small data packets, etc.). For a type of data packet, this information includes at least one of the following information:

Indication information of the data type (the protocol format corresponding to the data packet). The data type that the information can indicate includes at least one of the following types: MAC Protocol Data Unit (MAC PDU), MAC Service Data Unit (MAC SDU), RLC Protocol Data Unit (RLC PDU), RLC Service Data Unit (RLC SDU), PDCP Protocol Data Unit (PDCP PDU), PDCP Service Data Unit (PDCP SDU), etc.;

Identity information of logical channel, which indicates the logical channel used for data transmission. In one embodiment, the logical channel is the logical channel used for data transmission at the fourth node;

Identity information of logical channel group, which indicates the logical channel group in which the logical channel used for data transmission is located;

Identity information or index information of the bearer to which the data belongs, such as DRB ID, DRB Index, etc.;

Identity information or index information of the PDU session to which the data belongs, such as PDU session ID, PDU Session Index;

Identity information or index information of the QoS flow to which the data belongs, such as QoS Flow ID, QoS Flow Index;

User data packet, the data packet is a data packet transmitted by the user. In one embodiment, the data packet is a data packet transmitted by the user to the fourth node, the data packet may be a MAC PDU, or a MAC SDU, or RLC PDU, or RLC SDU, or PDCP PDU, or PDCP SDU, or can also be other types of data packet.

The method of information (which may include signaling and/or data) interaction between nodes provided in the present disclosure (a method of transmitting information) is described below. Between the nodes in the present disclosure may include between user devices and network nodes, and between different network nodes, and between the different network nodes may be between different base stations, between different entities of the same base station (e.g., between a central unit and a distributed unit of a base station), between a base station and a core network entity, etc.

The present disclosure provides an information transmission method, comprising: receiving a first message and/or transmitting a second message, to transmit a first data based on a resource configuration corresponding to the first message and/or the second message, the first message and the second message including information related the first data, wherein, the first data is data to be transmitted when a user device is in a first connection status, and the first connection status is a non-connectedstatus.

Optionally, transmission of the first data comprises at least one of the followings:

transmission of the first data based on the resource configuration;

initiating a random access request message, to transmit the first data based on the resource configuration.

It will be understood that the above first message and/or second message may include information relating to the resources used to transmit the first data (which may be one or more of small data, non-small data, or any other data to be transmitted), and may also include indicative information related to the first data, such as information about characteristics of the data as described later, etc.

In embodiments of the present disclosure, the first message and the second message may provide information about the first data to a receiving node of the message, and may also request information about the first data from a receiving node of the message. The first data may include uplink data and/or downlink data.

Based on this information transmission method provided in the present disclosure, a first message and/or a second message containing information about the first data may be interacted between a receiving node (a target receiving node or an intermediate receiving node) and a transmitting node (a source transmitting node or an intermediate forwarding node) of the first data, such that the receiving node and the transmitting node may implement the first data for transmission based on the first message and/or the second message. Optionally, the first message and/or the second message may include configuration information about the first data, such as providing a configuration about the first message to a receiving node of the message and/or requesting a configuration about the first data from a receiving node of the message.

In an optional embodiments of the present disclosure, the information transmission method may be performed by a user device, i.e., the receiving a first message and/or transmitting a second message is receiving a first message and/or transmitting a second message by a user device, the first message may include a third message and/or a fourth message, and the second message includes a fifth message and/or a sixth message, wherein the third message is used to configure the user device to provide information related to the transmission of the first data; the fourth message is used to provide the user device with the transmission configuration information for the first data; the fifth message is used to provide information related to the transmission of the first data; and the sixth message is used to request the transmission configuration information for the first data.

Optionally, the third message described above may include at least one of the followings:

request indication information for assistance information related to the first data; fifth indication information for the first data; and indication information for determining the first data.

Optionally, the above fourth message may include a third configuration information related to the resources used to transmit the first data (which may also be referred to as a third configuration information related to configured grant).

Optionally, the fifth message comprises at least one of the followings:

Sixth configuration information for the first data; sixth indication information for the first data; fifth assistance information for the first data; fifth information related to the carried data; information related to the cache status; and information related to more data transmission.

Optionally, the sixth information may include at least one of the followings:

Indication information requesting the first data transmission configuration; indication information releasing the first data transmission configuration; configuration information of the requested first data transmission.

In order to avoid excessive repetition of description, the description of each of the information contained in each of the above messages will be expanded in the description of embodiments later in this disclosure and will not be described herein first.

When the information transmission method is performed by the user device, the first message and/or the second message is a message for interaction between the user device and the network node, at which point the network node may be a base station, a central unit of the base station, a distributed unit of the base station, a control plane entity of the central unit of the base station, and a user plane entity of the central unit of the base station. The base station is a first base station or a second base station, the first base station is a serving base station before the user device entering the first connected status (upon entering the first connected status), and the second base station is a serving base station after the user device entering the first connected status, and the first base station and the second base station may or may not be the same base station. The user device and the network node achieve fast transmission of the data to be transmitted corresponding to the user device (the data to be transmitted by the user device, and/or the data to be transmitted to the user device, which may be small data when the user device is in the first connected status, or may be arbitrary data) by interacting the first message and/or the second message as described above.

Optionally, the third message may be a first user configuration request message as described in later embodiments of the present disclosure, the fourth message may be a second user configuration response message as described in later embodiments of the present disclosure, the fifth message may include a first user configuration response message and/or a third user configuration request message as described in later embodiments of the present disclosure, and the sixth message may include a second user configuration request message described in later embodiments of the present disclosure. In order to avoid excessive repetition of the description, the description of each message here may be found in the description of the corresponding message later in the text.

In an optional embodiment of the present disclosure, the information transmission method may be performed by a user device, and receiving the first message and/or transmitting the second message may include at least one of the followings:

receiving a third message transmitted by a first network node, and transmitting a fifth message to the first network node in response to the third message;

transmitting a sixth message to a second network node, and receiving a fourth message transmitted by the second network node, the fourth message being a response message to the sixth message;

transmitting a fifth message to a third network node to transmit the fifth message to a fourth network node via the third network node.

As an alternative, the fifth message may be a response to the third message, and the first network node may configure the user to provide information related to the transmission of the first data by transmitting the third message to the user device, and the user device, upon receiving the message, may provide information related to the transmission of the first data to the first network node via the fifth message.

As another alternative, the user device may request the transmission configuration information for the first data from the second network node via a sixth message, and the second network node, upon receiving the message, may provide the user device with the relevant transmission configuration information via a fourth message.

As another alternative, the user device may transmit the fifth message to other nodes (i.e., the fourth network node) via the third network node to provide the fourth network node with information related to the transmission of the first data via the third network node.

It will be appreciated that the above alternatives can be implemented individually or in combination, and in some optional embodiments, the first network node, the second network node, and the third network node can be the same node.

In optional embodiments of the present disclosure, the first network node, the second network node, the third network node, or the fourth network node may include at least one of the followings:

a first base station; a central unit or a distributed unit of the first base station; a user plane entity of the central unit of the first base station or a control plane entity of the central unit of the first base station; a second base station; a central unit or a distributed unit of the second base station; a user plane entity of the central unit of the second base station or a control plane entity of the central unit of the second base station.

The first base station is a serving base station before the user device entering the first connected status, and the second base station is a serving base station after the user device entering the first connected status.

That is, the first network node, the second network node, the third network node, and the fourth network node may all be a first base station or a second base station, or a constituent part of a first base station or a second base station in a separated structure. Based on the information transmission method provided by embodiments of the present disclosure, the transmission of the first data between the user device and the base station (the first base station, the second base station, the constituent part of the first base station, or the constituent part of the second base station) may be achieved by interacting configuration information related to the first data. Optionally, the first data may be transmitted during the interaction of the configuration information or after the completion of the interaction of the configuration information. The timing of occasion of the interaction procedure of the configuration information and the transmission of the first data is not limited by the embodiments of the present disclosure.

In an optional embodiment of the present disclosure, the above information transmission method may be performed by the fifth network node, and receiving the first message and/or transmitting the second message, comprises:

transmitting a second message to a sixth network node and/or receiving a first message from the sixth network node, wherein, the second message is used for providing configuration information related to the first data transmission, and/or, for requesting configuration information related to the first data transmission, and the first message is used for providing configuration information related to the first data transmission to the fifth network node.

Optionally, when the transmission method is performed by the fifth network node, the first message may include at least one of the followings:

Second configuration information of the first data; second low layer configuration information related to the first data; second configuration information related to the resource used to transmit the first data; setting information about a time alignment timer related to the resource used to transmit the first data; second configuration information related to the tunnel; second information related to the carried data; information related to the data type; fourth configuration information of first data; third low layer configuration information related to the first data; fifth configuration information related to the tunnel; tunnel request information; third assistance information; indication information of data reception status; and fourth information related to the carried data.

Optionally, when the transmission method is performed by the fifth network node, the second message may include at least one of the followings:

First configuration information of the first data; information related to the released first data; information related to the unreleased first data; first indication information for the first data (optionally, the information may include indication information for one or more different types of data, such as may include indication information for small data and/or indication information for non-small data); indication information for the first type of first data; indication information for a second type of first data; configuration request indication information for the first data; first low layer configuration information; first configuration information related to the resources used to transmit the first data; first configuration information related to the tunnel; tunnel request information; first assistance information; first information related to the carried data; cause information for transmitting the second message; third information relating to the carried data; fourth configuration information related to the tunnel; second assistance information; and timer information related to the transmission of the first data.

In order to avoid excessive repetition of the description, the description of the respective information contained in each of the above messages will be expanded in the description of the embodiments later in the present disclosure and will not be described herein first.

Based on the optional embodiment of the present disclosure, the interaction of configuration information related to the transmission of the first data can be implemented between different network nodes, such that the transmission of the first data can be implemented between different network nodes based on the obtained configuration information.

The fifth network node and the sixth network node may be different nodes of the same base station (e.g., a first base station or a second base station), or may be different base stations (e.g., a first base station and a second base station, or a structural entity of a first base station and a structural entity of a second base station), or between structural entities of different base stations, or may also be base station and core network node. That is, the information interaction procedure between the above-mentioned network nodes can be between the nodes within the base station, or between the base stations, or also between the base station and the core network.

It is to be noted that the description of the structural entity of the base station or the constituent part of the base station, etc., involved in the embodiments of the present disclosure is for a base station with a separated structure, and the structural entity or the constituent part may be a central unit of the base station, a control plane part of the central unit, a user plane part of the base station unit, or a distributed unit, etc.

Optionally, the fifth network node and the sixth network node are any of the following three items:

a first item: the sixth network node is a distributed unit of the first base station and the fifth network node is a central unit of the first base station or a control plane entity of a central unit of the first base station;

a second item: the sixth network node is a distributed unit of a second base station and the fifth network node is a central unit of a second base station or a control plane entity of a central unit of a second base station;

a third item: the fifth network node is a second base station, a central unit of the second base station, a user plane entity of a central unit of the second base station, a control plane entity of a central unit of the second base station, or a distributed unit of the second base station, and the sixth network node is a first base station, a central unit of the first base station, a user plane entity of a central unit of the first base station, a control plane entity of a central unit of the first base station, or a distributed unit of the first base station;

a fourth item: the fifth network node is a core network node ("a fifth node") and the sixth network node is any of the followings:

a first base station, a central unit of a first base station, a user plane entity of a central unit of a first base station, a control plane entity of a central unit of a first base station, a distributed unit of a first base station, a second base station, a central unit of a second base station, a user plane entity of a central unit of a second base station, a control plane entity of a central unit of a second base station, or a distributed unit of a second base station; and wherein the first base station is a serving base station before the user device entering the first connected status, and the second base station is a serving base station after the user device entering the first connected status.

As can be seen from the preceding description, the first base station and the second base station may be the same base station or may be different base stations. In one embodiment, the sixth network node may be "second node" as described in the preceding section, and the fifth network node may be "first node" as described in the preceding section. In one embodiment (corresponding to the first item above), the sixth network node may be a distributed unit of the first base station and the fifth network node is a central unit of the first base station or a control plane entity of the central unit of the first base station; in another embodiment (corresponding to the second item above), the sixth network node may be a distributed unit of the second base station and the fifth network node may be a central unit of a second base station or a user plane entity of a central unit of a second base station. The first base station is a serving base station before the user device entering the first connected status, and the second base station is a serving base station after the user device entering the first connected status.

When the fifth network node and the sixth network node are different nodes of the same base station, the information interaction within the base station can be achieved based on this optional embodiment, i.e., interaction between the distributed unit part and the central unit part of the first base station, or between the distributed unit part and the central unit part of the second base station. When the base station is a logical entity with a separated structure, in order to achieve the transmission of data to be transmitted regarding the user (data that needs to be transmitted when the user is in the first connected status), different nodes within the base station may complete configurations related to the transmission of data (e.g., small data) based on this interaction, so that the transmission of data may be completed based on these configurations.

Optionally, when the above method is performed by the fifth network node and the fifth network node and the sixth network node are different nodes within the same base station (as in the first or second item above), optionally, the above second message may be "a first data request message" as described in later embodiments of the present disclosure, and the fifth network node may provide configuration information related to data transmission to the sixth network node via this message and/or request configuration information related to data transmission from the sixth network node. Optionally, the first message may be "first data response message" as described in later embodiments of the present disclosure, by which the sixth network node may provide configuration information related to data transmission to the fifth network node.

To avoid excessive repetition of the description, the contents of the first message and the second message described above can be found in the description of the "first data request message" and the "first data response message" later in the document.

Optionally, when the first base station and the second base station are different base stations, i.e., the base station where the user is located before entering the first connected status and the base station where the user is located when data transmission is required after entering the first connected status are different base stations. As in the third item above, when the first base station and the second base station are different base stations, the fifth network node may be "a fourth node" as described in the preceding paragraph, the sixth network node may be "third node" introduced in the preceding paragraph. The second message may be "a first configuration request message" in later embodiments of the present disclosure, the first message may be "a first configuration response message" in the later embodiment of the present disclosure. The "fourth node" may request configuration information related to user data transmission from the "third node" through the "first configuration request message". The "third node" can provide the "fourth node" with the configuration information related to the user data transmission via the "first configuration response message". Similarly, to avoid repetition, the second message and the first message in this optional implementation can be described in the description of the "first configuration request message" and the "first configuration response message" in the later embodiments.

Optionally, the fifth network node may be a core network node, and the core network node may provide configuration information related to the first data transmission to the sixth network node ("a third node" or "a fourth node") by transmitting a second message to the sixth network node ("a third node" or "a fourth node"), wherein the second message may be "a third data request message" in later embodiments of the present disclosure, based on which optionally the sixth network node may interact with other nodes with configuration information related to the first data transmission.

In an optional embodiment of the present disclosure, transmitting the second message to the sixth network node and/or receiving the first message from the sixth network node may comprise:

transmitting a second message to the sixth network node;

receiving the first message transmitted by the sixth network node, wherein the first message is a response message to the second message.

In this embodiment, the fifth network node and the sixth network node may provide and/or request configuration information related to the transmission of the first data to each other to enable the transmission of the first data based on the relevant information obtained from each other.

In an optional embodiment of the present disclosure, the information transmission method may further comprise:

transmitting a seventh message to the sixth network node, the seventh message being used to provide configuration information related to the first data transmission.

Optionally, the seventh message may be a response message to the first message, i.e., transmitting the seventh message to the sixth network node may occur after receiving the first message from the sixth network node, e.g., after receiving the "first configuration response message" transmitted from the "third node", the "fourth node" may also transmit a seventh message to the "third node". The seventh message may also be called the "first configuration confirmation message". Optionally, the "first configuration confirmation message" may include a sixth configuration message related to the tunnel, which may be described in detail in optional embodiments later in the present disclosure.

In optional embodiments of the present disclosure, the fifth network node and the sixth network node may be structural entities of the second base station, i.e., the fifth network node may be a central unit or a control plane entity of a central unit of the second base station, and the sixth network node may be a distributed unit of the second base station, and the method may further comprise:

receiving an eighth message from the sixth network node, wherein the eighth message is used to request configuration information related to the first data from the fifth network node, the eighth message being transmitted by the sixth network node upon receiving the data transmission indication information from the user device;

in response to the eighth message, transmitting a ninth message to the sixth network node.

In this optional embodiment, the network node in which the interaction is taking place is a different node of the base station (e.g., the base station where the user is located when the user initiates the RRC resume procedure or the base station where the user is located when the user needs to perform the data transmission) to which the user connects upon performing data transmission in the first connection status. The data transmission indication information serves as an information that the user device informs the distributed unit of the second base station that it has data to be transmitted, the specific form of the information is not limited by the embodiments of this disclosure. Optionally, the information may be an RRC resume request message and/or a data packet (e.g., a data packet of small data), etc., and the distributed unit of the second base station, upon receiving this message from the user, may transmit configuration information related to the data (e.g., small data) to be transmitted to the central unit or the control plane entity by transmitting the eighth message to the central unit of the second base station or the control plane entity of the base station unit. Optionally, the central unit or the control plane entity of the central unit, after receiving the first message, may also provide the configuration related to the data to be transmitted to the distributed unit by transmitting the message to the distributed unit.

Based on this optional embodiment, a user in the first connected status may trigger a signaling interaction between the distributed unit and the central unit (or the control plane entity of the central unit) of the second base station by transmitting a data transmission indication information to the distributed unit of the second base station when data transmission is required, so that the distributed unit and the central unit may obtain configuration information used for data transmission, and thus the configuration information obtained between the distributed unit and the central unit for data transmission.

Optionally, the eighth message may also be "a second data request message" in a later embodiment of the present disclosure, and the ninth message may be "a second data response message" in a later embodiment of the present disclosure.

It is noted that "referring to" in the present disclosure means that the content items contained in different information or messages may be partially or fully identical, but the specific information items contained in each item may be the same or different.

In an optional embodiment of the present disclosure, after transmitting the ninth message to the sixth network node, the method may further include:

receiving a response message to the ninth message sent by the sixth network node;

wherein the response message may also be "a second data confirmation message" in later embodiments of the present disclosure, which serves to provide configuration information related to the first data transmission to the fifth network node, and the contents of message can be found in the "first data response message" in the preceding section.

In order to better illustrate and understand the various optional implementations provided in the present disclosure, the solutions of the present disclosure are further described below in conjunction with various optional embodiments. The various optional implementations of the above information transmission method provided in the present disclosure can be divided into three aspects of information interaction between different nodes, including information interaction within a base station, information interaction between base stations, and information interaction between a user device and a base station. The optional embodiments of the present disclosure will be described below in terms of each of these three aspects.

First Aspect: Configuration and Data Transmission within the Base Station

The transmission of data (e.g., small data, which will be used as an example below) in this disclosure occurs when the user is in a non-connected status (e.g., Inactive or other status), and for this purpose, the base station needs to generate or obtain some configuration information that supports the transmission of these small data. When the base station is a logical entity with a separated structure (e.g., the base station includes a central unit and a distributed unit, or the base station includes a control plane part of the central unit, a user plane part of the central unit and the distributed unit), the signaling interactions are required between these nodes to accomplish the configuration of small data transmission.

Figure 3:
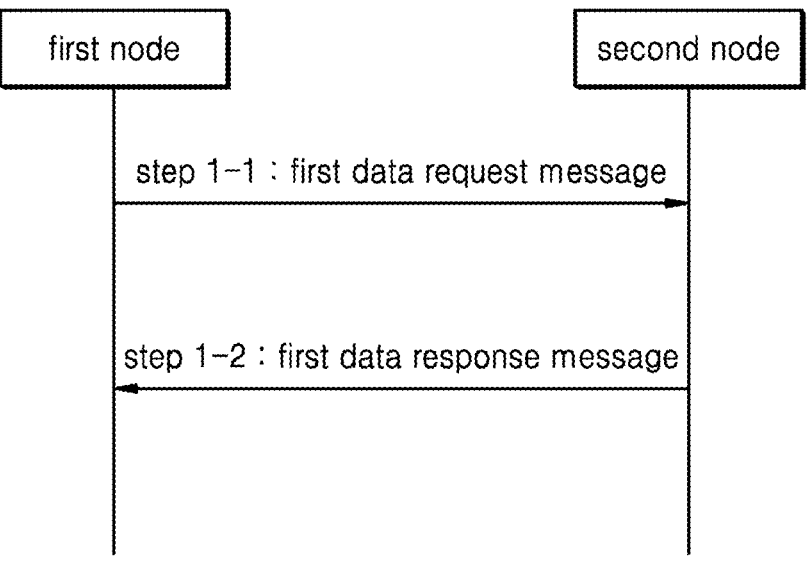
FIG. 3 is a schematic flowchart of an information transmission method in an optional embodiment of the present disclosure.

FIG. 3 is a schematic flowchart of an information transmission method in one embodiment of the present disclosure. As shown in FIG. 3, the method can be implemented between a central unit of a base station (or a control plane part of a central unit of a base station, or a user plane part of a central unit of a base station) and a distributed unit of a base station, and the signaling interaction procedure in this embodiment can include the following steps:

Step 1-1: The first node transmits a first data request message (the second message in this embodiment) to the second node, which may serve to 1) provide configuration information related to data transmission to the second node, and 2) request the second node to provide configuration information related to data transmission. Optionally, the message may include at least one of the following information:

First configuration information for the data; information relating to the released data; information related to the unreleased data; first indication information for the small data; indication information for the non-small data; indication information for the small data configuration request; indication information for the configuration request; first low layer configuration information; first configuration information related to the configured grant; first configuration information related to the tunnel; tunnel request information; first assistance information; first information related to the carried data.

Wherein, each of the above information is as following.

The first configuration information of the data, the content of which can be found in the "configuration information of the data" above (i.e., "1) the configuration information of the data" in the previous section).

Information related to the released data, which serves to instruct the second node to release configuration information related to data transmission (e.g. information related to tunnel, RLC layer configuration information, logical channel configuration information, etc.), the data can be radio bearer data, or PDU session data, or QoS flow data, the information includes at least one of the followings:

Identity information of radio bearer, which indicates the identity of the radio bearer, such as DRB ID, SRB ID, corresponding to the configuration information to be released;

Identity information of PDU session, which indicates the identity of the PDU session, e.g., PDU Session ID, corresponding to the configuration information to be released;

Identity information of QoS flow, which indicates the identity of the QoS flow, e.g., QoS flow ID, corresponding to the configuration information to be released;

Optionally, the radio bearer or PDU session or QoS flow that is not in this information related to the data to be released, wherein, the second node does not need to release the relevant configuration information (e.g. information related tunnel, RLC layer configuration information, logical channel configuration information, etc.);

Information related to unreleased data, which serves to indicate the configuration information related to data transmission (e.g., information related tunnel, RLC layer configuration information, logical channel configuration information, etc.) that the second node does not need to release, the data may be data of radio bearer or PDU session or QoS flow, the information includes at least one of the followings:

Identity information of radio bearer, e.g., DRB ID, SRB ID;

Identity information of PDU session, e.g., PDU Session ID;

Identity information of QoS flow, e.g., QoS Flow ID;

Wherein, the identity information of radio bearer, the identity information of PDU session and the identity information of QoS flow are indicative of the identity of radio bearer, the identity of PDU session, and the identity of QoS flow, respectively, corresponding to the configuration information that does not need to be released, First indication information of small data, the contents of which can be found in the "indication information of small data" above ("2) indication information of small data" in the previous section).

Indication information for non-small data, which serves to indicate radio bearer of non-small data or PDU session of non-small data or QoS flow of non-small data, etc., in one embodiment, and serves to indicate that the second node need not provide the first node with configuration information for the data indicated by the indication information, in another embodiment.

Small data configuration request indication information (Small Data configuration query/request), which serves to request the second node to provide the first node with configuration information related to small data (one or more small data bearers or small data PDU sessions or small data QoS flows, etc., as indicated by the "First configuration information of the data" above, one or more small data bearers or small data PDU sessions or small data QoS flows as indicated by the "First indication information of small data" above, etc.). In one embodiment, the requested configuration information may be some or all of the information in low layer configuration information (such as the configuration information contained in CellGroupConfig IE, RLC configuration information, logical channel configuration information) and other information. In another embodiment, the requested configuration information can be the configuration information related to configured grant (such as Configured Grant Configuration). In another embodiment, for random access based small data, the requested configuration information is the low layer configuration information (such as the configuration information contained in Cell-GroupConfig IE, RLC configuration information, configuration information for logical channel), and for small data based on the configured grant, the requested configuration information is configuration information related to configured grant configuration.

Configuration request indication information (configuration query/request), which serves to request the second node to provide configuration information for data (first data, which can be any data to be transmitted such as small data, non-small data, etc.) transmission to the first node. In one embodiment, the requested Identity information can be low layer configuration information (such as the configuration information contained in the CellGroupConfig IE, the configuration information of the RLC, the configuration information of the logical channel). In another embodiment, the requested configuration information may be configuration information related to the configured grant. In another embodiment the requested configuration information can be the low layer configuration information (e.g., the configuration information contained in CellGroupConfig IE, the configuration information of the RLC, the configuration information of the logical channel), and the configuration information related to the configured grant (e.g., Configured Grant Configuration). In one embodiment, this information may be included in the procedure of modifying the user's context, such as in the F1AP UE Context Modification Request (F1 Application Protocol-based User Context Modification Request) message, and in another embodiment, this information may be included in the procedure of releasing the user's context, such as in the F1AP UE Context Release Command (F1 Application Protocol-based User Context Release Request) message.

A first low layer configuration information, which serves to provide configuration information related to small data to the second node, the information can be included in the "low layer configuration information" described above, i.e., "4) low layer configuration information" in the previous section.

A first configuration information related to configured grant, which serves to configure the resources (e.g. uplink resources, e.g. PUSCH) to be used by the second node for small data transmission, the content of information can be found in the "configuration information related to configured grant" above, i.e., "5) configuration information related to configured grant" in the previous section.

A first configuration information related to tunnel, the content of which can be found in the "configuration information related to tunnel" above, i.e., "3) configuration information related to tunnel" in the preceding section, the "tunnel information" in the information can be the information of the tunnel (e.g. uplink tunnel) used to receive or transmit small data at the first node, or the information of the tunnel (e.g. uplink tunnel, or data forwarding tunnel) used to receive or transmit small data at other base stations (e.g. the last serving base station). In one embodiment, the "first configuration information related to tunnel" is given separately for one or more small data radio bearers (or small data PDU sessions, or small data QoS flows, or logical channels for small data, or logical channel groups for small data). In another embodiment, the "first configuration information related to tunnel" is given for all small data radio bearers (or PDU sessions for small data, or QoS flows for small data, or logical channels for small data, or logical channel groups for small data), i.e., one tunnel is used for data transmission of all radio bearers for small data (or PDU sessions for small data, or QoS flows for small data, or logical channel groups for small data).

A tunnel request message that serves to request the second node to provide configuration information related to tunnel. In one embodiment, the requested tunnel is a tunnel for small data (e.g., a tunnel for a small data bearer, a tunnel for a small data PDU session, a tunnel for a small data QoS flow, a tunnel for a small data logical channel, a tunnel for a small data logical channel group). Further, the information may also indicate identity information for a small data radio bearer (or a small data PDU session, or a small data QoS flow, or a logical channel for small data, or a logical channel group for small data) that requires the second node to provide configuration information related to the tunnel.

A first assistance information that serves to inform the second node of the assistance information of the small data. In one embodiment, the second node generates a configuration (e.g., configuration information for configured grant) according to the information, the information may include at least one of the followings:

Feature information (Traffic Pattern Information) of the data that indicates characteristics of the data transmission, the information may include at least one of the followings:

Period of the data (traffic periodicity), which indicates the period of the transmission of the data;

Timing offset of the data, which indicates a time offset in the time domain of the resource used for data transmission. Further, the offset may be an offset relative to a time point (e.g., a subframe, a system starting frame, a superframe, etc.);

Logical channel identity of the data, which indicates the logical channel of the transmitted data;

Logical channel group identity of the data, which indicates the logical channel of the transmitted data;

Size of the data (message size), which indicates the size of the transmitted data;

Identity information of the radio bearer, which indicates the identity of the radio bearer used to carry the data;

Identity information of PDU session, which indicates the PDU session to which the data belongs;

Identity information of QoS flow, which indicates the QoS flow to which the data belongs.

In one embodiment, this first assistance information may be referred to the UE assistance information message in TS36.331/TS38.331.

The first information relating to the carried data, the data is transmitted by the user, possibly directly by the user to the first node, or by the user to other nodes, then forwarded to the first node by other nodes. The contents of this information can be found in the "information related to the carried data" above (i.e., "6) information related to the carried data" in the previous section). Upon receipt of this data, the second node decodes the data according to the relevant configuration (e.g. the configuration information contained in the "first low layer configuration information" above). Thus, the second node can transmit the decoded data to the first node (e.g. the data transmission is performed according to the tunnel configured by the "first configuration information related to the tunnel" above).

Step 1-2: the second node transmits a first data response message (first message in this embodiment) to the first node, which serves to provide configuration information related to data transmission to the first node, and further, the first node can configure the user data transmission based on the received configuration information. The message includes at least one information of the followings:

Second configuration information for the data, the contents of which can be found in "configuration information for data" above;

Second low layer configuration information, which serves to provide the first node with information related to the configuration of the small data (or all data), the contents of the information can be found in "low layer configuration information" above, i.e., "4) low layer configuration information" in the previous sections;

Second configuration information related to configured grant, which is the configuration information generated by the second node for the resources (e.g. uplink resources, e.g., PUSCH) used to transmit small data, the contents of the information can be found in "configuration information related to configured grant" above, i.e., "5) configuration information related to configured grant" in the preceding section, and the information can be obtained by the first node to configure the user;

Setting information of the time alignment timer for configured grant, which is used to indicate the validity time for configured grant, i.e., after which the configuration information related to configured grant is no longer available and the user cannot use the configured resources for data transmission;

Second configuration information related to tunnel, the content of which can be found in the "configuration information related to tunnel" above, i.e., "3) configuration information related to tunnel" in the preceding section. The "tunnel information" contained in the information can be information about the tunnel (such as a downlink tunnel, or a data forwarding tunnel) used to receive or transmit small data at the second node. In one embodiment, the "second configuration information related to tunnel" is given separately for each small data radio bearer (or small data PDU session, or small data QoS flow, or logical channel for small data, or logical channel group for small data). In another embodiment, the "second configuration information related to tunnel" is given for all small data radio bearers (or small data PDU sessions, or small data QoS flows, or logical channels for small data, or logical channel groups for small data), i.e., one tunnel is used for all small data radio bearers (or small data PDU sessions, or small data QoS streams, or logical channels for small data, or logical channel groups for small data) for data transmission;

A second information related to the carried data, the carried data is transmitted by the user to the second node, or by the first node to the second node, the information indicates information related to such data. The content of this information can be found in "information related to the carried data" above, i.e., "6) information related to the carried data" in the previous section. After the first node receives the data, in one embodiment, the first node decodes the data according to the relevant configuration (e.g., PDCP configuration) and transmits the data to the core network (e.g., UPF), and in another embodiment, the first node transmits the data to other base stations according to the relevant configuration (e.g., tunnel configuration).

Optionally, the procedure of steps 1-1 and 1-2 above may occur during user context setup or user context modification or user context release, and the first data request message and the first data response message may be UE Context Setup Request message and UE Context Setup Response message, or UE Context Modification Request message and UE Context Modification Response message, respectively, or UE Context Release Command message and UE Context Release Complete message, or other messages, e.g., also the newly defined messages of F1 interface. In addition, the first data request message and the first data response message can also be data packets of user plane for the transmission of user data, that is, the first data request message and first data response message may transmit signaling and/or user plane data.

Embodiments of the above procedures are given below depending on the different base station at which the first node and the second node are located. In each embodiment, the specific contents of the information contained in the first data request message and the first data response message can be found described in steps 1-1 and 1-2 above, respectively. In the following embodiments, the data to be transmitted is mostly described as an example of small data and the first connection status is the Inactive. It should be noted that the following embodiments can also be applied to any data to be transmitted, and the first connection status can also be other non-normal connection statuses.

Embodiment 1-a (This Embodiment is RA-SDT, Based on Which the Configuration in Last Serving BS can be Implemented)

The procedure of this embodiment takes place at the last serving BS and primarily performs the configuration of random access small data transmission, optionally, the procedure contains the steps of followings:

Step 1-*a*-1: the first node transmits a first data request message (the second message in this embodiment) to the second node, the message comprises at least one of the following information:

First configuration information for the data;

Information related to the released data;

Information relating to the data that is not released;

First indication information for small data;

Indication information for non-small data;

Configuration request indication information for small data;

Configuration request indication information;

First assistance information;

Step 1-*a*-2: the second node transmits a first data response message (the first message in this embodiment) to the first node, the message confirms the configuration requested in the first data request message described above. In addition, the message may include at least one of the following information:

Second configuration information of the data;

Second low layer configuration information.

The above procedure may occur during user context modification or release, and the messages in the above two steps may be UE Context Modification Request message and UE Context Modification Response message, respectively, or UE Context Release Command message and UE Context Release Complete message, respectively. Optionally, if the messages in the above two steps are UE Context Modification Request message and UE Context Modification Response message respectively, the first node and the second node will also perform user context release procedure, in turn configuring the user to the first connection status, e.g., Inactive.

The beneficial effect of the above procedure is that the first node may obtain configuration information for the user's small data (e.g., on the distributed unit side) before configuring the user in the Inactive, and optionally, the first node may transmit this information to other nodes, such as other base stations, thereby helping the node receiving the user's data (e.g., the distributed unit of other base stations, or other base stations) to perform the data transmission.

Embodiment 1-b (This Embodiment is RA-SDT, Based on Which the Configuration Performed in the Serving BS can be Implemented)

The procedure of this embodiment occurs at the serving base station, i.e., the base station where the user performs the small data transmission, and the configuration of the random access based small data transmission is mainly performed, and the procedure contains the steps of followings:

Step 1-*b*-1: the first node transmits a first data request message (the second message in this embodiment) to the second node, the message comprises at least one of the following information:

First configuration information for the data;

First indication information for the small data;

First low layer configuration information;

First configuration information related to tunnel, wherein the tunnel indicated in the information is the tunnel used by the first node or the last serving base station to receive or transmit the small data;

Tunnel request information;

First assistance information;

Step 1-*b*-2: The second node transmits a first data response message (the first message in this embodiment) to the first node, the message confirms the configuration in the first data request message described above, and the message may also include at least one of the following information:

Second configuration message relating to tunnel, wherein, the tunnel indicated in the message is the tunnel used by the second node to receive or transmit small data.

The above procedure may occur during user context setup or modification. In the above procedure, the first data request message and the first data response message may be UE Context Setup Request message and UE Context Setup Response message, respectively, or UE Context Modification Request message and UE Context Modification Response message, respectively.

The beneficial effect of the above procedure is that the first node and the second node may perform the transmission of small data based on the configuration information transmitted in the procedure. Optionally, the data transmission may be performed without requiring the user to enter the Connected status.

Embodiment 1-c (This Embodiment is CG-SDT, Based on Which the Configuration Performed in Last Serving BS can be Implemented)

The procedure of this embodiment occurs prior to configuring the user to the Inactive status, and the configuration of the small data transmission for configured grant is mainly performed, and the procedure contains the steps of followings:

Step 1-*c*-1: The first node transmits a first data request message (the second message in this embodiment) to the second node, the message includes at least one of the following information:

First configuration information of the data;

Information related to the released data;

Information relating to data that is not released;

First indication message for the small data;

Configuration request indication information for small data;

Configuration request indication information;

First configuration information related to tunnel;

Tunnel request information;

First assistance information;

Step 1-*c*-2: the second node transmits a first data response message (the first message in this embodiment) to the first node, the message confirms the configuration of the first data request message, and the message may also include at least one of the following information:

Second configuration information for the data;

Second configuration information related to the configured grant;

Setting information of a time alignment timer for the configured grant, wherein the first node, upon receiving the information, may obtain a valid time for configured grant based on the information, thereby deciding whether to release the configuration used for transmission of the small data;

Second configuration information related to tunnel.

The above procedure may occur during user context modification or release, in the above procedure, the first data request message and the first data response message may be UE Context Modification Request message and UE Context Modification Response message, respectively, or UE Context Release Command message and UE Context Release Complete message, respectively.

The beneficial effect of the above procedure is that the first node and the second node may interact the configuration information of the small data before configuring the user to the Inactive status, thus configuring the user, and the first node and/or the second node may perform the transmitting of the small data of the user based on the obtained configuration information after that the user enters the Inactive status.

Embodiment 1-d (Which Provides a CG-SDT Based on Which the Configuration Performed in the Serving BS can be Implemented)

The procedure of this embodiment occurs after that the user enters the Inactive status and occurs at the serving base station, and the configuration of the small data transmission for configured grant is mainly performed, the serving base station and the last serving base station are same base station, and the procedure contains the steps of followings:

Step 1-d-1: the first node transmits a first data request message (the second message in this embodiment) to the second node, and the message includes at least one of the following information:

First configuration information for the data;

First indication information for the small data;

First configuration information related to configured grant;

First configuration information related to tunnel, the tunnel being a tunnel used by the first node to transmit (receive or transmit) the small data;

First assistance information;

Step 1-d-2: the second node transmits a first data response message (the first message in this embodiment) to the first node, the message confirms the first data request message described above, and the message may also include at least one of the following information:

Second configuration information related to tunnel, the tunnel being a tunnel used by the second node to transmit (receive or transmit) small data.

The above procedure may occur during user context setup or modification, in the above procedure, the first data request message and the first data response message may be UE Context Setup Request message and UE Context Setup Response message, respectively, or UE Context Modification Request message and UE Context Modification Response message, respectively.

The beneficial effect of the above procedure is that the first node and the second node can transmit small data based on the configuration information transmitted in the procedure, optionally, the data transmission can be performed without requiring the user to enter the Connected status.

Embodiment 1-e (Which Provides an RA-SDT & CG-SDT (Random Access Based Small Data Transmission and Small Data Transmission Based on Configured Grant) Based on Which the Configuration Performed in Last Serving BS can be Implemented)

The procedure of this embodiment occurs before configuring the user to the Inactive status (i.e., occurs within the last serving BS) and primarily performs the configuration of the small data transmission, the small data can be either random access based small data or configured grant based small data or can include both random access based small data and configured grant based small data, the procedure contains the following steps:

Step 1-e-1: The first node transmits a first data request message (second message in this embodiment) to the second node, and the message includes at least one of the following information:

First configuration information of the data;

Information related to the released data;

Information related to the data that is not released;

First indication information for small data;

Indication information for non-small data;

Configuration request indication information for small data;

Configuration request indication information;

First assistance information;

Step 1-e-2: the second node transmits a first data response message (second message in this embodiment) to the first node, the message confirms the first data request message described above, and the message may also include at least one of the following information:

Second configuration information of the data;

Second low layer configuration information;

Second configuration information related to configured grant;

Setting Information about the time alignment timer for the configured grant.

The above procedure may occur during a user context modification or release. In the above procedure, the first data request message and the first data response message may be UE Context Modification Request message and UE Context Modification Response message, respectively, or UE Context Release Command message and UE Context Release Complete message, respectively.

The beneficial effect of the above procedure is that the first node may obtain configuration information for the user's small data (e.g., on the distributed unit side, such as configuration information for random access based small data, or may be configuration information for configured grant based small data) before configuring the user to the Inactive status. Optionally, the first node may transmit this information to other nodes or other base stations, thereby assisting the other nodes or other base stations with the transmission of small data, which may include transmission of configured grant based small data and/or transmission of random access based small data.

Embodiment 1-f (Which Provides an RA-SDT & CG-SDT, Based on Which the Configuration Performed in the Serving BS can be Implemented)

The procedure of this embodiment occurs after configuring the user to the Inactive status, which is used to configure the user for small data transmission, the small data can be random access based small data, or configured grant based small data, or can include both random access based small data and configured grant based small data, the procedure comprises the steps of followings:

Step 1-f-1: the first node transmits a first data request message (the second message in this embodiment) to the second node, the message comprises at least one of the following information:

First configuration information for the data;

First indication information for the small data;

Indication information for non-small data;

First low layer configuration information;

First configuration information related to configured grant;

First configuration information related to tunnel;

Tunnel request information;

First assistance information;

Step 1-f-2: the second node transmits a first data response message (the first message in this embodiment) to the first node, the message confirms the first data request message described above, and the message may also include at least one of the following information:

Setting information about the time alignment timer for configured grant;

Second configuration information related to tunnel.

The above procedure may occur during user context setup or modification. In the above procedure, the first data request message and the first data response message may be UE Context Setup Request message and UE Context Setup Response message, respectively, or UE Context Modification Request message and UE Context Modification Response message, respectively.

The beneficial effect of the above procedure is that when the user enters the Inactive status, the configuration of the small data transmission between the first node and the second node can be performed, and thus the user does not need to enter the connected status to still perform the small data transmission.

Embodiment 1-g (This Embodiment Provides a Way of Transmitting User Plane Data on the Last Serving Base Station Side)

This embodiment occurs after a first node receiving user data from other nodes, the first node may not be able to decode the user data, so that the first node needs to transmit the data to a second node and then hand it to the second node for decoding, the procedure can be done using signaling interactions at the control plane, the procedure can include the following steps:

Step 1-g-1: the first node transmits a first data request message (the second message in this embodiment) to the second node, the message includes at least one of the following information:

First message related to the carried data;

First low layer configuration information that, in one embodiment, may assist the second node in decoding the user data;

First configuration information related to tunnel that, in one embodiment indicates the tunnel information on the first node side used by the second node in transmitting the user data to the first node;

Step 1-g-2: the second node transmits a first data response message (the first message in this embodiment) to the first node, the message comprises at least one of the following information:

Second message related to the carried data.

In the above procedure, the first data request message and the first data response message may be UE Context Setup Request message and UE Context Setup Response message (user context establishment response message), respectively, or UE Context Modification Request message and UE Context Modification Response message, respectively, or it may be a data packet of user plane.

The beneficial effect of the above procedure is: when the first node is unable to decode the user data, the first node can hand it over to the second node for decoding, and then the second node will transmit the decoded data to the first node, and the first node will transmit the data to the core network.

The solution provided in the first aspect of the present disclosure may have at least the following beneficial effects.

The first node interacts with the second node for configuration information of the user, thereby generating or obtaining configuration information used by the user to perform data (e.g., small data) transmission that can assist the first node and/or the second node and/or other nodes to perform transmission of small data of the user (e.g., small data transmission after that the user enters the Inactive status). Optionally, the beneficial effect can occur before that the user enters the Inactive status.

The first node interacts with the second node for the user's configuration information, for configuring the two nodes to perform the transmission of the user's data (e.g., small data), and in turn the first node and/or the second node may receive and transmit the user's small data from the user or from other nodes based on this configuration information. Optionally, the beneficial effect may occur while the user is performing the small data transmission.

Decoding and transmission of user data (e.g., small data) may be performed between the first node and the second node, and the decoded data is transmitted to the core network.

Figure 4:
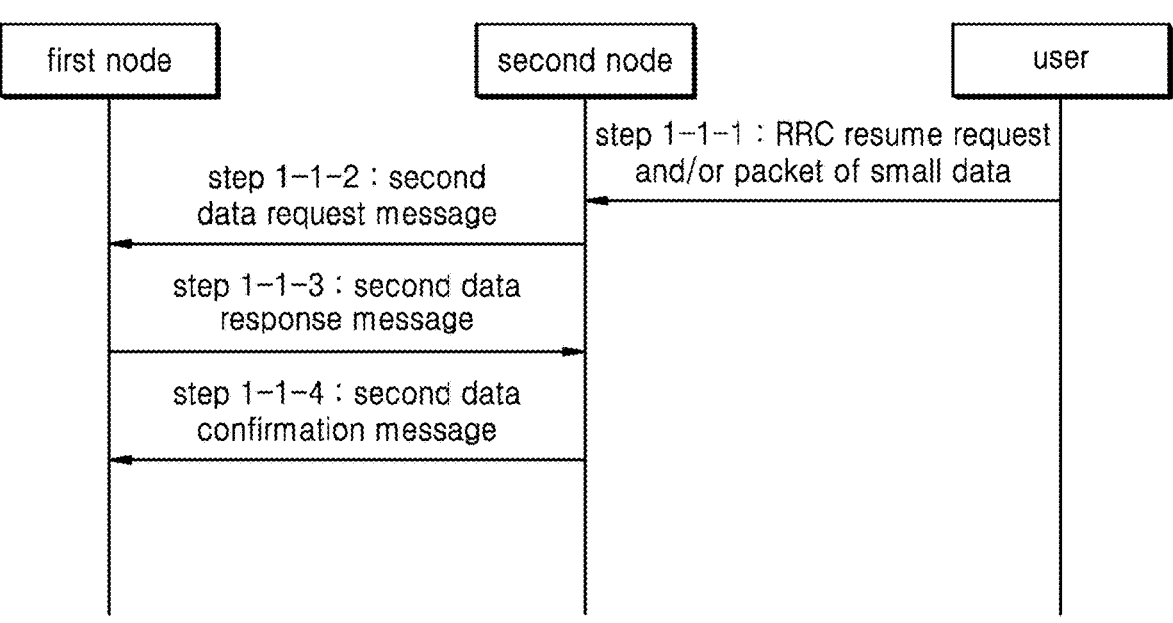
FIG. 4 is a schematic flowchart of an information transmission method in an optional embodiment of the present disclosure.

In one embodiment, when the first node and the second node as described above are the base station (i.e., serving BS) where the user is located when initiating the RRC resume procedure (or small data transmission), as shown in FIG. 4, the information interaction method provided by the present disclosure may further include the following procedures:

Step 1-1-1: the second node receives an RRC resume request message and/or a packet of small data (data transmission indication information in this embodiment) from the user;

Step 1-1-2: the second node transmits a second data request message (eighth message in this implementation) to the first node, which serves to provide configuration information related to small data to the first node. Optionally, this message can be an Initial UL RRC Message Transfer message as defined in TS38.473, or may be UE Context Modification Required message, or may be other information or a newly defined message. Optionally, this second data request message may also include at least one of the following information:

Third configuration information for the data; second indication information for the small data; identity information of the logical channel; fourth assistance information; and third configuration information related to tunnel.

Each of the above information that may be included in the second data request message is specified as following:

Third configuration information for the data, the content of which can be found in "configuration information for the data" above;

Second indication information for the small data, the content of which can be found in "indication information for the small data";

Identity information for the logical channel, which serves to indicate the logical channel to which the small data received by the second node belongs, and the information may also include identity information for one or more logical channels when the second node receives packets belonging to more than one logical channel;

Fourth assistance information, which serves to transmit the assistance information by the first node to other base stations (e.g., the last serving base station) and to help other nodes or other base stations decide whether to re-locate the user's context to the first node. In one embodiment, the assistance information may be provided by the user, the assistance information comprising at least one of the following information:

Information related to the cache status; information related to more data transmission; feature information about the data; and information indicating no data transmission.

Each of the above information that may be included in the fourth assistance information is specified as following:

Information related to the cache status, which serves to indicate the size of the data to be transmitted by the user, and the information includes at least one of the following information:

Buffer status report information that contains the size of the data to be transmitted by the user, such as the number of bits, the number of bytes, the number of packets, etc. In one embodiment, this information may be an index information, and further this index information indicates the size of the data to be transmitted by the user, such as 1 indicating that the size of data to be transmitted is less than or equal to 10 bytes, 2 indicates that the size of the data to be transmitted is less than or equal to 14 bytes, etc. In one embodiment, the content contained in this information can be found BSR size in TS38.321 or TS36.321;

Logical channel identity information indicating the logical channel, e.g. Logical Channel ID, used by the user to transmit data (e.g. small data, or small data based on random access). In one embodiment, the information indicates the logical channel corresponding to the above mentioned "cache status report information", that is, the logical channel used to transmit the data corresponding to the "cache status report information". In another embodiment, the information indicates the logical channel on which the fourth node (the second base station, the central unit of the second base station, the control plane part or the user plane part of the central unit of the second base station) receives the cache status report information of user;

Identity information of logical channel group that indicates the logical channel group used by the user to transmit data (e.g., small data, or random access based small data), i.e., the logical channel group that transmits the data to be transmitted, such as a Logical Channel Group ID, the logical channel group indicated by the information may include one or more logical channels. Further, the information further comprises identity information of one or more logical channels included in logical channel group. In one embodiment, this information indicates the logical channel group corresponding to the above "cache status report information", i.e., the logical channel group used to transmit the data corresponding to the above "cache status report information". In another embodiment, the information indicates the logical channel group on which the fourth node receives the cache status report information of user;

Indication information of logical channel, which serves to indicate whether the user transmits data on the respective logical channel. In one embodiment, the information may be a bitmap (bitmap) where each bit of the bitmap represents a logical channel, and the value of each bit indicates whether the user transmits data on the logical channel, such as "1" means that there is data, "0" means that there is no data, or "1" means that there is no data, "0" means that there is data. Further, in order to indicate the amount of data to be transmitted, the indication information may also be combined with the "cache status report information" described above to indicate the amount of data to be transmitted on the logical channel with data;

Indication information of logical channel group, which serves to indicate whether the user transmits data on each logical channel group, one logical channel group may contain one or more logical channels. In one embodiment, the information may be a bitmap where each bit of the bitmap represents a logical channel group, and the value of each bit indicates whether the user transmits data on the logical channel group, such as "1" for data, "0 for no data, or "1" for no data, "0" for data. Further, to indicate the amount of data to be transmitted, the indication information may also be combined with the "cache status report information" described above to indicate the amount of data to be transmitted on the logical channel group with data.

In one embodiment, the above "information related cache status" is information contained in the MAC layer control element transmitted by the user to the second node.

Information related to more data transmission, which serves to indicate whether the user has more data to transmit, either uplink or downlink data, or both uplink and downlink data, and the information includes at least one of the following:

Indication information for more data transmission;

Indication information of logical channel for more data transmission, wherein the information serves to indicate a logical channel with more data transmission. In one embodiment, the information comprises identity information for one or more logical channels with more data transmission. In another embodiment, the information may be a bitmap, wherein each bit of the bitmap represents a logical channel, the value of each bit indicates whether the user has data to transmit on the logical channel, such as "1" for data, "0" for no data, or "1" for no data, and "0" for data;

Indication information of logical channel group with more data transmission, wherein the information serves to indicate a logical channel group with more data transmission. In one embodiment, the information comprises identity information for one or more logical channel groups with more data transmission. In another embodiment, the information may be a bitmap, wherein each bit of the bitmap represents a logical channel group, and the value of each bit indicates whether the user has data to transmit on the logical channel group, such as "1" for data, "0" for no data, or "1" for no data, "0" for data;

Indication information of radio bearer with more data transmission, wherein the information serves to indicate radio bearer with more data transmissions. In one embodiment, the information contains identity information for one or more radio bearers with more data transmission. In another embodiment, the information may be a bitmap, wherein each bit of the bitmap represents a radio bearer, and the value of each bit represents indicates whether the user has data to transmit on the radio bearer, such as "1" for data, "0" for no data, or "1" for no data, and "0" for data.

Indication information for PDU session with more data transmission, where the information serves to indicate PDU session with more data transmission. In one embodiment, the information contains identity information for one or more PDU sessions with more data transmission. In another embodiment, the information may be a bitmap, where each bit of the bitmap represents a PDU session, and the value of each bit indicates whether the user has data to transmit on the PDU session, such as "1" for data, "0" for no data, or "1" for no data, "0" for data;

Indication information for QoS flow with more data transmission, where the information serves to indicate QoS flow with more data transmission. In one embodiment, the information contains identity information for one or more QoS flows with more data transmission. In another embodiment, the information may be a bitmap, where each bit of the bitmap represents a QoS flow, and the value of each bit indicates whether the user has data to transmit on the QoS flow, such as "1" for data, "0" for no data, or "1" for no data, "0" for data;

Feature information of data (Traffic Pattern Information), which indicates the characteristics of the data transmission, wherein the information includes at least one of the following information;

Period of the data (traffic periodicity);

Timing offset of the data;

Logical channel identity of the data;

Logical channel group identity of the data;

Size of the data (message size);

Identity information of the radio bearer;

Identity information of the PDU session;

Identity information for QoS flow;

Indication information of no data transmission, which serves to indicate that there is no user data to be transmitted at the second node. In one embodiment, the data may be small data. In another embodiment, the data may be random access based small data. In another embodiment, the data is configured grant based small data. Upon receipt of the information, the first node may release resources for transmitting user data, such as tunnel;

Third configuration information related to tunnel, the content of which can be found in the "configuration information related to tunnel" above, and the "tunnel information" contained in the information can be the information of tunnel (such as the downlink tunnel, or the data forwarding tunnel) used to receive or transmit the small data at the second node. In one embodiment, the above "third configuration information related to tunnel" is given separately for each small data radio bearer (or small data PDU session, or small data QoS flow, or logical channel for small data, or logical channel group for small data). In another embodiment, the above "third configuration information related to tunnel" is given for all small data radio bearer (or small data PDU session, or small data QoS flow, or logical channel for small data, or logical channel group for small data), i.e., one tunnel is used for all small data radio bearers (or small data PDU sessions, or small data QoS streams, or logical channels for small data, or logical channel groups for small data) for data transmission;

Step 1-1-3: optionally, the first node transmits a second data response message (ninth message in this embodiment) to the second node, which serves to provide configuration information related to small data to the second node, and the message may be UE Context Modification request message as defined in TS 38.473, or UE Context Modification Confirm message, or may be a newly defined message, the contents of the message can be found in the first data request message in step 1-1 above.

Further, optionally, step 1-1-4 may also be included after step 1-1-3, wherein the second node transmits a second data confirmation message (response message to the ninth message in this embodiment) to the first node, which serves to provide the first node with configuration information related to the small data transmission, and the contents of message may be found in the first data response message in step 1-2 above.

The beneficial effect of the above procedure is: the second node, upon receiving the small data from the user, triggers a signaling interaction with the first node to obtain the configuration information used for the small data transmission, and thus performing the transmission of the small data between the first node and the second node.

Second Aspect: Configuration and Data Transmission Between Base Stations

Figure 5:
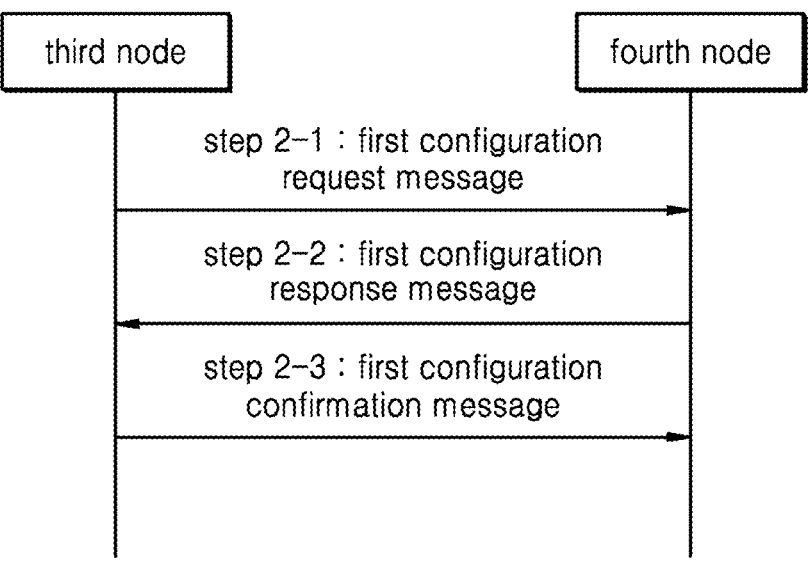
FIG. 5 is a schematic flowchart of an information transmission method in an optional embodiment of the present disclosure.

After that the user enters a first connected status (e.g., Inactive), the user may move to other base stations, such that the user needs to transmit small data with other base stations. To support this scenario, interaction of configuration information related to data transmission and transmission of data between base stations is required. Therefore, a second aspect of the present disclosure proposes a signaling interaction procedure and a method for data transmission between base stations. The nodes involved in this second aspect include a third node and a fourth node, and as an optional embodiment, as shown in FIG. 5, the signaling interaction procedure may include the following steps:

Step 2-1: the fourth node transmits a first configuration request message (the second message in this embodiment) to the third node, which serves to request configuration information related to user data transmission from the third node. In one embodiment, the content of message may be contained in the Retrieve UE Context Request message in TS36.423 or TS38.423, and in addition, the first configuration request message may include at least one of the following information:

Cause information; third information related to the carried data; fourth configuration information related to tunnel; second assistance information; and timer information. Each of the above information is specified as following:

Cause information, which serves to indicate the cause for transmitting this first configuration request message, the cause indicated by this information may be one of the following: small data transmission, random access based small data transmission, configured grant based small data transmission, etc. In one embodiment, the information may be named as RRC Resume Cause;

Third information related to the carried data, optionally, the first configuration request message described above may carry some user data that may be transmitted by the user to the fourth node, and this third message indicates information related to such data. The content of this information can be found in the "information related to the carried data" above, i.e., in "6) information related to the carried data";

Fourth configuration information related to tunnel, the content of which can be found in the "configuration information related to the tunnel" above, i.e. "3) configuration information related to tunnel" in the previous section, and the "tunnel information" contained in the information may be information about a tunnel (such as a downlink tunnel, or a data forwarding tunnel) used to receive or transmit small data at a fourth node (a distributed unit of a fourth node, a central unit of a fourth node, or a user plane part of a central unit of a fourth node). In one embodiment, the above "fourth configuration information related to tunnel" may be given separately for one or more small data radio bearers (or small data PDU sessions, or small data QoS flows, or logical channels for small data, or logical channel groups for small data). In another embodiment, the above "fourth configuration information related to tunnel" may be given for all small data radio bearers (or small data PDU sessions, or small data QoS flows, or logical channels for small data, or logical channel groups for small data), i.e., one tunnel is used for all small data radio bearers (or small data PDU sessions, or small data QoS streams, or logical channels for small data, or logical channel groups for small data) for data transmission.

Second assistance information that serves to help the third node decide on the configuration of the user data transmission. In one embodiment, the information may help the third node decide whether to re-locate the user's context to the fourth node, the information comprises at least one of the following information:

Information related to cache status; information related to more data transmission; feature information of the data; and information indicating no data transmission.

Wherein, the second assistance information may comprise each of the above information as following:

Information relating to cache status, the information serving to indicate the size of the data to be transmitted by the user, the information comprising at least one of the following:

Buffer status report information that contains the size of the data to be transmitted by the user, such as the number of bits, the number of bytes, the number of packets, etc. In one embodiment, this information may be an index information, and further this index information indicates the size of the data to be transmitted by the user, such as 1 indicates that the sized of data to be transmitted is less than or equal to 10 bytes, 2 indicates that the size of the data to be transmitted is less than or equal to 14 bytes, etc., and in one embodiment the content contained in this information may refer to the BSR size in TS38.321 or TS36.321;

Logical channel identity information that indicates the logical channel, such as Logical Channel ID, used by the user to transmit data (e.g., small data, or small data based on random access). In one embodiment, the information indicates the logical channel corresponding to the "cache status report information" described above. In another embodiment, this information indicates the logical channel on which the user buffer status report is received at the fourth node;

Identity information for logical channel group that indicates the logical channel, such as Logical Channel ID, used by the user to transmit data, such as small data, or random access based small data, which may include one or more logical channels. Further, the information may include identity information for one or more logical channels included in the logical channel group. In one embodiment, the information indicates the logical channel group corresponding to the "buffer status report information" described above, and in another embodiment, the information indicates the logical channel group on which the user buffer status report is received at the fourth node;

Indication information for the logical channel, which serves to indicate whether the user has data to transmit on each logical channel. In one embodiment, the information may be a bitmap (bitmap), wherein each bit of the bitmap represents a logical channel, and the value of each bit indicates whether the user has data to transmit on the logical channel, such as "1" for data, "0" for no data, or "1" for no data, "0" for data. Further, in order to indicate the amount of data to be transmitted, the indication information may also be combined with the "cache status report information" described above to indicate the amount of data to be transmitted on the logical channel with data;

Indication information for logical channel groups, the information serves to indicate whether the user has data to transmit on each logical channel group, a logical channel group may contain one or more logical channels. In one embodiment, the information may be a bitmap, wherein each bit of the bitmap represents a logical channel group, and the value of each bit indicates whether the user has data to transmit on the logical channel group, such as "1" for data, "0" for no data, or, "1" for no data, "0" for data. Further, to indicate the amount of data to be transmitted, the indication information may be combined with the "cache status report information" described above to indicate the amount of data to be transmitted on the logical channel group with data;

In one embodiment, the above "information related to cache status" may be information contained in a MAC layer control element transmitted by the user to the fourth node.

Information related to more data transmission, which serves to indicate whether the user has more data to transmit, either uplink data or downlink data, or both uplink and downlink data, and the information includes at least one of the following:

Indication information for more data transmission;

Indication information of logical channel for more data transmission, the information serving to indicate a logical channel with more data transmission. In one embodiment, the information comprises identity information of one or more logical channels with more data transmission. In another embodiment, the information may be a bitmap, wherein each bit of the bitmap represents a logical channel, and the value of each bit indicates whether the user has data to transmit on the logical channel, such as "1" for data, "0" for no data, or, "1" for no data, "0" for data;

Indication information of logical channel group with more data transmissions, the information serving to indicate a logical channel group with more data transmission. In one embodiment, the information comprises identity information of one or more logical channel groups with more data transmission. In another embodiment, the information may be a bitmap, wherein, each bit of the bitmap represents a logical channel group, and the value of each bit indicates whether the user has data to transmit on the logical channel group, such as "1" for data, "0" for no data, or, "1" for no data, "0" for data;

Indication information of radio bearer with more data transmission, the information serving to indicate a radio bearer with more data transmission. In one embodiment, the information comprises identity information of one or more radio bearers with more data transmission. In another embodiment, the information may be a bitmap, wherein, each bit of the bitmap represents a radio bearer, and the value of each bit indicates whether the user has data to transmit on the radio bearer, such as "1" for data, "0" for no data, or, "1" for no data, "0" for data;

Indication information of PDU session with more data transmission, the information serving to indicate a PDU session with more data transmission. In one embodiment, the information comprises identity information of one or more PDU sessions with more data transmission. In another embodiment, the information may be a bitmap, wherein, each bit of the bitmap represents a PDU session, and the value of each bit indicates whether the user has data to transmit on the PDU session, such as "1" for data, "0" for no data, or, "1" for no data, "0" for data;

Indication information of QoS flow with more data transmission, the information serving to indicate a QoS flow with more data transmission. In one embodiment, the information comprises identity information of one or more QoS flows with more data transmission. In another embodiment, the information may be a bitmap, wherein, each bit of the bitmap represents a QoS flow, and the value of each bit indicates whether the user has data to transmit on the QoS flow, such as "1" for data, "0" for no data, or, "1" for no data, "0" for data;

Feature information of data (Traffic Pattern Information), which indicates the characteristics of the data transmission, wherein the information includes at least one of the following information;

Period of the data (traffic periodicity);

Timing offset of the data;

Logical channel identity of the data;

Logical channel group identity of the data;

Size of the data (message size);

Identity information of the radio bearer;

Identity information of the PDU session;

Identity information for QoS flow;

Wherein, the description of the above information that can be included in the feature information of the data can be found in the description of the feature information of the data in the previous section.

Indication information of no data transmission, which serves to indicate that there is no user data to be transmitted at the fourth node. In one embodiment, the data may be small data. In another embodiment, the data may be random access based small data. In another embodiment, the data is configured grant based small data. Upon receipt of the information, the third node may release resources for transmitting user data, such as tunnel;

Timer information that serves to indicate the time length of timer that the fourth node or third node performs data transmission. In one embodiment, when the timer is started or restarted, the fourth node or third node will only transmit data for the length of time indicated by that timer information, and if the length of time ends, the user ends the data transmission at the fourth node, or the user enters the Inactive status, or the user ends the RRC resume procedure, or the third node can release resources (e.g., tunnel) for user data transmission. In another embodiment, if the fourth node or third node has no data transmission for the length of time, the user ends the data transmission at the fourth node, or the user enters the Inactive status, or the user ends the RRC resume procedure, or the third node may release resources (e.g., tunnel) for user data transmission.

Specifically, in one embodiment, the timer information may be the duration defined by T319 in TS38.331. In another embodiment, the information is the duration of a newly defined timer. Further, optionally, the timer also has a certain start condition, i.e., the timer may perform timing only when this start condition is satisfied, e.g., the start condition may be the user transmitting an RRC resume message to the fourth node, or the user transmitting data to the fourth node, the fourth node transmitting the first user packet to the third node, etc.; further, optionally, the timer may also have a certain restart condition, i.e., the timer may be also restarted (e.g., start timing from zero) if the restart condition is satisfied during the timing procedure, e.g., the restart condition may be the fourth node receiving the data transmitted by the user, or the third node receiving the data from the user, etc. Upon receipt of the timer information, the third node may stop performing the transmission of user data after the length of time indicated by this information, and release the corresponding resources (e.g., tunnel), or the third node starts this timer after receiving the first user data packet and stops performing the transmission of user data after the length of time indicated by this timer, and releases the corresponding resources (e.g., tunnel), or the third node may restart the timer for each user data transmission and stop performing the user data transmission after the length of time indicated by that timer, and release the corresponding resources (e.g., tunnel).

Step 2-2: optionally, the third node transmits a first configuration response message (the first message in this embodiment) to the fourth node, which serves to provide the fourth node with configuration information related to the user data transmission. In one embodiment, the content of message may be included in the Retrieve UE Context Response message or Retrieve UE Context Failure message in TS36.423 or TS38.423. Optionally, the first configuration response message may further comprise at least one of the following information:

Information related to data type; fourth configuration information for the data; third low layer configuration information; fifth configuration information related to tunnel; tunnel request information; third assistance information; indication information of data reception status; and fourth information related to the carried data.

Each of the above information that may be included in the first configuration response message may be as following:

Information related to the type of data, which serves to indicate the type of data transmitted between the fourth node and the third node, such as MAC PDU, MAC SDU, RLC PDU, RLC SDU, PDCP PDU, PDCP SDU, other types of data, etc.;

Fourth configuration information of data, which serves to indicate the configuration information of the data transmission between the fourth node and the third node, the content of information can be found in the "configuration information of the data" above;

Third low layer configuration information, which serves to provide the third node with configuration information related to small data (or all data), the content of information can be found in the "low layer configuration information" above;

Fifth configuration information related to tunnel, the content of which can be found in the "configuration information related to tunnel" above. The "tunnel information" contained in this information may be information about the tunnel (such as a downlink tunnel, or a data forwarding tunnel) used to receive or transmit small data at the third node (the base station, or the central unit of the base station, or the user plane part of the central unit of the base station). In one embodiment, the above "fifth configuration information related to tunnel" is given separately for one or more small data radio bearers (or small data PDU sessions, or small data QoS flows, or logical channels for small data, or logical channel groups for small data). In another embodiment, the above "fifth configuration information related to tunnel" is given for all small data radio bearers (or small data PDU sessions, or small data QoS flows, or logical channels for small data, or logical channel groups for small data), i.e., one tunnel is used for all small data radio bearers (or small data PDU sessions, or small data QoS flows, or logical channels for small data, or logical channel groups for small data) for data transmission;

Tunnel request information which serves to request the fourth node to provide configuration information related to tunnel. In one embodiment, the requested tunnel is a tunnel for small data (e.g. a tunnel for small data bearer, a tunnel for small data PDU session, a tunnel for small data QoS flow, a tunnel of logical channel for small data, a tunnel of logical channel groups for small data). Further, the information may also indicate identity information for a small data radio bearer (or a small data PDU session, or a small data QoS flow, or a logical channel for small data, or a logical channel group for small data) that requires the fourth node to provide configuration information associated with the tunnel;

Third assistance information, which serves to inform the fourth node of the assistance information of the small data. In one embodiment, the fourth node generates configuration (e.g., configuration information for configured grant) based on the information, and the message includes at least one of the following information:

Feature information of data (Traffic Pattern Information), which indicates the characteristics of the data transmission, wherein the information includes at least one of the following information;

Period of the data (traffic periodicity);

Timing offset of the data;

Logical channel identity of the data;

Logical channel group identity of the data;

Size of the data (message size);

Identity information of the radio bearer;

Identity information of the PDU session;

Identity information for QoS flow;

In one embodiment, this third assistance information may be found in the UEAssistanceInformation message in TS36.331/TS38.331;

Indication information of the data reception status, which serves to indicate whether the user data contained in step 2-1 can be correctly received by the third node, such as it can be correctly received, or it cannot be correctly received;

Fourth information related to the carried data, which indicates information related to the data transmitted by the third node to the fourth node. The content of this information can be found in "information related to the carried data" above, i.e., "6) information related to the carried data" in the preceding section;

Step 2-3: optionally, the fourth node transmits a first configuration confirmation message (seventh message in this embodiment) to the third node, which serves to provide the fourth node with configuration information related to data transmission to the third node, and the message may include at least one of the following information:

Sixth configuration information related to tunnel, the content of which can be found in the "configuration information related to the tunnel" above, i.e., "3) configuration information related to the tunnel" in the previous section. The "tunnel information" contained in the information may be information about a tunnel (such as a downlink tunnel, or a data forwarding tunnel) used to receive or transmit small data at a fourth node (base station, or a distributed unit of a base station, or a central unit of a base station, or a user plane part of a central unit of a base station). In one embodiment, the above "sixth configuration information related to tunnel" may be given separately for one or more small data radio bearers (or small data PDU sessions, or small data QoS flows, or logical channels for small data, or logical channel groups for small data), in another embodiment, the above "sixth configuration information related to tunnel" may be given for all small data radio bearers (or small data PDU sessions, or small data QoS flows, or logical channels for small data, or logical channel groups for small data), i.e., one tunnel is used for all small data radio bearers (or small data PDU sessions, or small data QoS streams, or logical channels for small data, or logical channel groups for small data) for data transmission.

Optionally, the first configuration request message described above may be Retrieve UE Context Request message in TS36.423 or TS38.423, or may be another message or newly defined message, and the first configuration response message may be Retrieve UE Context Request message or Retrieve UE Context Response message in TS36.423 or TS38.423, or can be another message or newly defined message. The first configuration confirmation message can be Xn-U Address Indication message in TS38.423, or can be another message or newly defined message.

Several optionally different embodiments of a second aspect of the present disclosure are provided below according to the procedure described above. In each embodiment, the specifics of the information contained in the first configuration request message, the first configuration response message, and the first configuration confirmation message can be found described in step 2-1, step 2-2, and step 2-3 above, respectively.

Embodiment 2-a (the Embodiment is Based on UE Context Relocation)

In this embodiment, the user initiates the RRC resume procedure (or the transmitting of small data) at the fourth node, and the fourth node can obtain the user's context from the third node, and in turn, the transmission of small data can be performed between the fourth node and the user without performing user data transmission with the third node. The procedure of this embodiment includes the following steps:

Step 2-a-1: the fourth node transmits a first configuration request message to the third node, which may contain content as described in the Retrieve UE Context Request message in TS 36.423 or TS 38.423, and in addition, the first configuration request message may include at least one of the following information:

Cause information;

Third message related to the carried data;

Second assistance message;

Timer information;

Step 2-a-2: the third node transmits a first configuration response message to the fourth node, the message may contain content as described in Retrieve UE Context Response message in TS36.423 or TS38.423. In addition, the first configuration response message further comprises at least one of the following information:

Fourth configuration information for the data;

Third assistance information;

Indication information of data reception status.

In the above procedure, the first configuration request message may be Retrieve UE Context Request message in TS36.423 or TS38.423, and the first configuration response message may be Retrieve UE Context Response message in TS36.423 or TS38.423, or can be any other message.

The beneficial effect of the above procedure is: the fourth node can obtain the user's context from the third node, and the fourth node can perform small data transmission based on the context.

Embodiment 2-b (This Embodiment Does Not Have UE Context Relocation)

In this embodiment, the user initiates the RRC resume procedure (or the transmitting of the small data) at the fourth node, the fourth node cannot obtain the user's context from the third node, and thus, the transmission of the small data needs to be performed between the third node and the user. Specifically, the fourth node receives the user data from the user and transmits the data to the third node, or the third node transmits the user data to the fourth node, which transmits it to the user. The procedure of the embodiment includes the following steps:

Step 2-b-1: the fourth node transmits a first configuration request message to the third node, the message may contain content as described in Retrieve UE Context Request message in TS36.423 or TS38.423, and in addition, the first configuration request message may include at least one of the following information:

Cause information;

Third information related to the carried data;

Second assistance information;

Timer information;

Step 2-b-2: the third node transmits a first configuration response message to the fourth node, the message may contain content as described in Retrieve UE Context Failure message in TS36.423 or TS38.423. In addition, the first configuration response message further includes at least one of the following information:

Information related to the type of data;

Fourth configuration information for the data;

Third low layer configuration information;

Fifth configuration information related to tunnel;

Tunnel request information;

Third assistance information;

Indication information of data reception status.

Step 2-b-3: optionally, the fourth node transmits a first configuration confirmation message to the third node, the message includes at least one of the following information:

Sixth configuration information related to tunnel.

In the above procedure, the first configuration request message may be Retrieve UE Context Request message in TS36.423 or TS38.423, the first configuration response message may be Retrieve UE Context Failure message in TS36.423 or TS38.423, or may be other messages, and the first configuration confirmation message may be Xn-U Address Indication message in TS38.423, or may be other messages.

The beneficial effect of the above procedure is: the fourth node may obtain the relevant configuration for performing the small data transmission from the third node, and the fourth node performs the small data transmission with the user based on the configuration and transmits the data to the third node, or the third node performs the small data transmission with the fourth node based on the configuration and then transmits the data to the user. The possible types of data transmitted between this third node and the fourth node are at least one of the following types: MAC PDU, MAC SDU, RLC PDU, RLC SDU, PDCP PDU, PDCP SDU, etc.

Embodiment 2-c (Based on the Embodiment, the User Plane Data Transmission can be Implemented)

In this embodiment, the fourth node will perform user data (small data) transmission with the third node, i.e., the fourth node will transmit the data transmitted by the user to the third node, or the third node will transmit the user data to the fourth node and the fourth node will transmit it to the user. The procedure of the embodiment includes the following steps:

Step 2-c-1: the fourth node transmits a first configuration request message to the third node, the message is a user plane packet. In one embodiment, depending on the packet carried in the message being different (e.g., belonging to different radio bearers, or different PDU sessions, or different QoS flows, or different logical channels, or different logical channel groups), the message is transmitted through different tunnels to the third node. In another embodiment, the message will carry different types of packets and be transmitted by the same tunnel to the third node, the message may include at least one of the following information:

Third message related to the carried data.

Step 2-c-2: the third node transmits a first configuration response message to the fourth node, which is a user plane packet. In one embodiment, depending on the packets carried in the message being different (e.g., belonging to different radio bearers, or different PDU sessions, or different QoS flows, or different logical channels, or different logical channel groups), the message is transmitted through different tunnels to the fourth node. In another embodiment, the message will carry different types of packets and be transmitted by the same tunnel to the fourth node, the message may include at least one of the following information:

Fourth message related to the carried data,

In the above procedure, steps 2-c-1 and 2-c-2 may be performed sequentially, in any order, or separately and independently, and the tunnel information used in transmitting the data may be obtained based on the configuration information in steps 2-1/2-2/2-3.

The beneficial effect of the above procedure is: the transmission of user data (small data) between the fourth node and the third node can be performed through a user plane tunnel, and the radio bearer (or PDU session, or QoS flow, or logical channel, or logical channel group) to which the data belongs is determined based on the information contained in the transmitted data. The possible type of data transmitted between the third node and the fourth node is at least one of the following types: MAC PDU, MAC SDU, RLC PDU, RLC SDU, PDCP PDU, PDCP SDU, etc.

The beneficial effects of the above procedure are:

1) interaction of the user context is performed between the third node and the fourth node, so that the fourth node obtains the user's context for the transmission of the user's small data;

2) the configuration used for the user small data transmission are interacted between the third node and the fourth node, and the user small data transmission is performed between the both.

Figure 6:
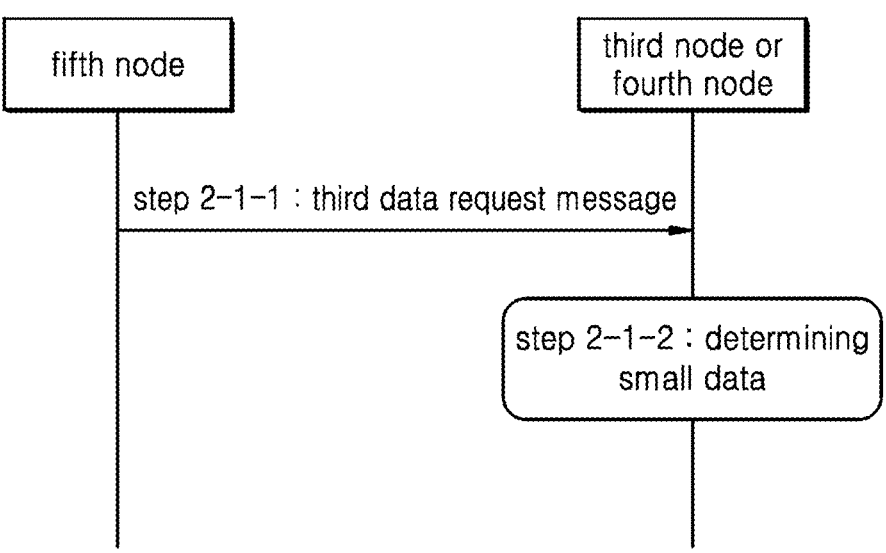
FIG. 6 is a schematic flowchart of an information transmission method in an optional embodiment of the present disclosure.

In the above procedure, an interaction procedure between the fifth node and the third node or the fourth node may also be included, which serves to configure the data to be transmitted on the third node or the fourth node, as in FIG. 6, the procedure may include the steps of followings:

Step 2-1-1: the fifth node (the fifth network node in this embodiment) transmits a third data request message to the third node or the fourth node, which serves to provide configuration information related to data transmission to the third node or the fourth node, the message may be PDU Session Resource Setup Request message or PDU Session Resource Modify Request message in TS38.413, or Initial UE Context Setup Request message, or can be other messages or newly defined message. In addition, the message may include at least one of the following information:

Fifth configuration information for the data, the contents of which can be found in "configuration information for the data" above;

Third indication information for the small data, the contents of which can be found in the "indication information for the small data" described above;

Step 2-1-2: the third node or the fourth node determines the small data based on the information received in step 2-1-1 and may then interact with other nodes for configuration information related to the small data transmission. For example, the third node may be a first base station, and the first base station may interact with the second base station for configuration information related to the small data transmission based on the information contained in the third data request information received from the core network node as described above. For another example, the third node may be a control plane part of a central unit of the first base station, and the control plane part of the central unit of the first base station may interact with the user plane part of the central unit of the first base station for configuration information related to small data transmission based on messages received from the core network node, i.e., the third node or the fourth node may perform intra-base station or inter-base station interaction of configuration information related to small data transmission according to the messages received from the core network.

The beneficial effect of the above procedure is: the third node or the fourth node can determine a small data radio bearer, or a small data PDU session, or a small data QoS flow, and then interact with other nodes for configuration information about small data transmission and perform transmission of small data.

Figure 7:
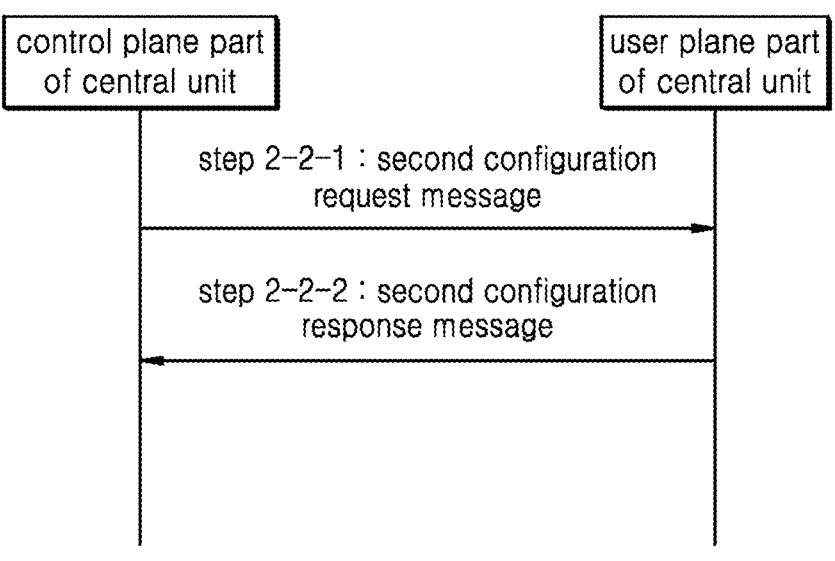
FIG. 7 is a schematic flowchart of an information transmission method in an optional embodiment of the present disclosure.

In the procedure of the above optional embodiment provided in the present disclosure, the third node may be a first base station and the fourth node may be a second base station, and if the third node or the fourth node includes a central unit and a distributed unit, and the central unit includes a control plane part of the central unit and a user plane part of the central unit, it may also include an interaction procedure between the control plane part of the central unit and the user plane part of the central unit, i.e. may also include an interaction procedure between different structural entities within the base station. Optionally, the interaction procedure may occur after steps 2-1 and 2-2, as shown in FIG. 7, the interaction procedure may include:

Step 2-2-1: the control plane part of the central unit transmits a second configuration request message to the user plane part of the central unit, which may be the Bearer Context Setup/Modification Request message in TS 38.463. In addition, the message may further include at least one of the followings:

Indication information for resuming data transmission, the information serving to indicate that the data to be transmitted needs to be resumed, the information comprising at least one of the followings:

Identity information of the radio bearer, such as DRB ID, SRB ID;

QoS information of the radio bearer;

Identity information of the PDU session, e.g., PDU Session ID;

QoS information of PDU session;

Identity information of QoS flow, e.g. QoS Flow ID;

QoS information of QoS flow;

Identity information for the type of data, which may indicate at least one of the following types;

Small data;

Random access based small data;

Configured grant based small data;

Non-small data;

Indication information for resuming small data transmission, wherein the indication information informs the user plane part of the central unit that configuration information (e.g., tunnel) related to small data (or small data radio bearers, or small data PDU sessions, or small data QoS flows, etc.) transmission may be resumed. In one embodiment, the information indicates resuming transmission of all small data;

Fourth indication information for small data, the contents of which can be found in the "indication information for small data" above;

Seventh configuration information related to tunnel, the contents of which can be found in the "configuration information related to tunnel" above. The "tunnel information" contained in this information can be the information about the tunnel (such as downlink tunnel, or data forwarding tunnel) used by other nodes (such as the distributed unit part of the fourth node) upon the user plane part of the central unit performing small data transmission with other nodes (base stations, or distributed units of base station, or central units of base station, or user plane part of central units of base station). In one embodiment, the above "seventh configuration information related to tunnel" is given separately for one or more small data radio bearers (or small data PDU sessions, or small data QoS flows, or logical channels for small data, or logical channel groups for small data). In another embodiment, the above "seventh configuration information related to tunnel" is given for all small data radio bearers (or small data PDU sessions, or small data QoS flows, or logical channels for small data, or logical channel groups for small data), i.e. one tunnel is used for all small data radio bearers (or small data PDU sessions, or small data QoS streams, or logical channels for small data, or logical channel groups for small data) for data transmission.

Step 2-2-2: optionally, the user plane part of the central unit transmits a second configuration response message to the control plane part of the central unit, the message may be Bearer Context Setup/Modification Response message in TS 38.463.

The beneficial effect of the above procedure is: the user plane part of the central unit can resume transmitting configuration information for small data and transmitting small data with other nodes. Wherein, the above procedure may be an interaction procedure between the control plane part of the central unit of the first base station and the user plane part of the central unit of the first base station, or may be an interaction procedure between the control plane part of the central unit of the second base station and the user plane part of the central unit of the second base station.

Third Aspect: Interaction Between the Base Station and the User

Figure 8:
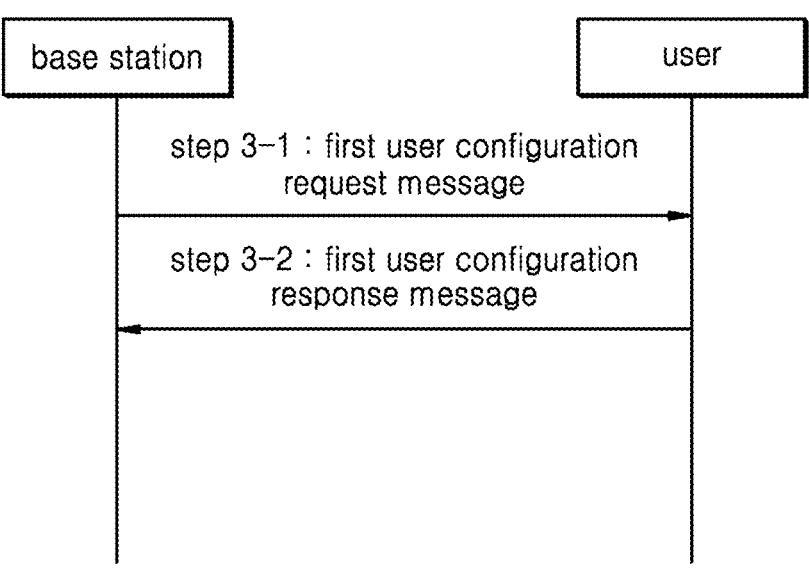
FIG. 8 is a schematic flowchart of an information transmission method in an optional embodiment of the present disclosure.

To enable the transmission of user data (e.g., small data), there is some signaling interaction between the base station and the user, which serves to help the base station to obtain the transmission feature of the user data and to help the base station to determine the user data. Thus, the third aspect of the present disclosure gives the method of interaction between the base station and the user, the base station can be the third node or the fourth node mentioned above. Optionally, as shown in FIG. 8, the interaction procedure may include the following steps, taking as an example that the user data to be transmitted is small data.

Step 3-1: the base station (third node or fourth node) transmits a first user configuration request message to the user, which serves to configure the user to provide the base station with assistance information to aid in the transmission of the small data, the message may include at least one of the followings:

Request indication information for assistance information related to the small data; fifth indication information for the small data; and indication information for determining the small data;

Request indication information for assistance information related to the small data, the information serving to instruct the user to provide serving information about the small data;

Fifth indication information for small data, the content of which can be found in the "indication information for small data" described in the previous section, i.e., "2) indication information for small data";

Indication information for determining small data, which serves to help the user to determine which data are small data, and the information may include at least one of the followings:

Threshold information for the amount of data; indication information for feature of the data transmission;

Threshold information for the amount of data, which indicates the threshold for the amount of data for small data, and the information may include at least one of the followings:

Threshold size information, such as bits of data, number of bytes, number of packets;

Time information that indicates information about the size of a time window for the amount of statistical data, wherein the unit may be in seconds, milliseconds, minutes, hours, etc.

In one embodiment, the amount of data is less than or equal to the above threshold information size, and/or, the data that the size of a time window for the amount of statistical data is less than or equal to the time window size information, may be referred to as small data.

Indication information of feature of the data transmission, which indicates feature of the small data transmission, the information may include at least one of the followings:

Period of the data (traffic periodicity), indicating a period of the transmission of the small data;

Timing offset of the data, indicating a timing offset of the small data transmission;

Logical channel identity of the data, indicating the identity of the logical channel on which the small data is transmitted;

Logical channel group identity of the data, indicating the identity of the logical channel group for the transmission of small data;

Size of the data (message size), indicating the size of the transmitted small data;

Identity information for the radio bearer, indicating the identity of the radio bearer used to carry the small data, i.e., the identity of the radio bearer for the small data;

Identity information for a PDU session, indicating the identity of the PDU session to which the small data belongs;

Identity information of the QoS flow, indicating the identity of the QoS to which the small data belongs.

Step 3-2: the user transmits a first user configuration response message to the base station (third node or fourth node) that serves to provide the assistance information to the base station to aid in the transmission of the small data, and the message may include at least one of the followings:

Sixth configuration information for the data; sixth indication information for the small data; fifth assistance information;

Sixth configuration information of the data, the contents of which may be included in "configuration information of the data" in the preceding paragraph, i.e., "1) configuration information of the data" in the previous section;

Sixth indication information for small data, the contents of which can be found in the preceding "indication information for small data", i.e., "2) indication information for small data" in the preceding section;

Fifth assistance information, which serves to inform the base station of the assistance information about the small data, and the information may include at least one of the followings:

Feature information of the data (Traffic Pattern Information), indicating feature of the data transmission, and the feature information may include at least one of the followings:

Period of the data (traffic periodicity);
Timing offset of the data
Logical channel identity of the data;
Logical channel group identity of the data;
Size of the data (message size);
Identity information of the radio bearer;
Identity information of the PDU session;
Identity information of the QoS flow;
Wherein, the role of the information that may be included in the information about the feature of the data can be found in the information included in "indication information for the feature of the data transmission" in step 3-1.

In one embodiment, the "fifth assistance information" may be referred to UE Assistance Information message in TS36.331/TS38.331.

In the above procedure, the first user configuration request message may be RRC Reconfiguration message in TS38.331 or RRC Connection Reconfiguration message in TS36.331, or other messages or newly defined message. The first user configuration response message may be UE Assistance Information message in TS36.331/TS38.331 or other messages or newly defined message.

The beneficial effect of the above procedure is: the base station can obtain small data assistance information that helps the base station to determine small data and configure the transmission of small data (e.g., small data transmission performed after the user entering the Inactive).

Figure 9:
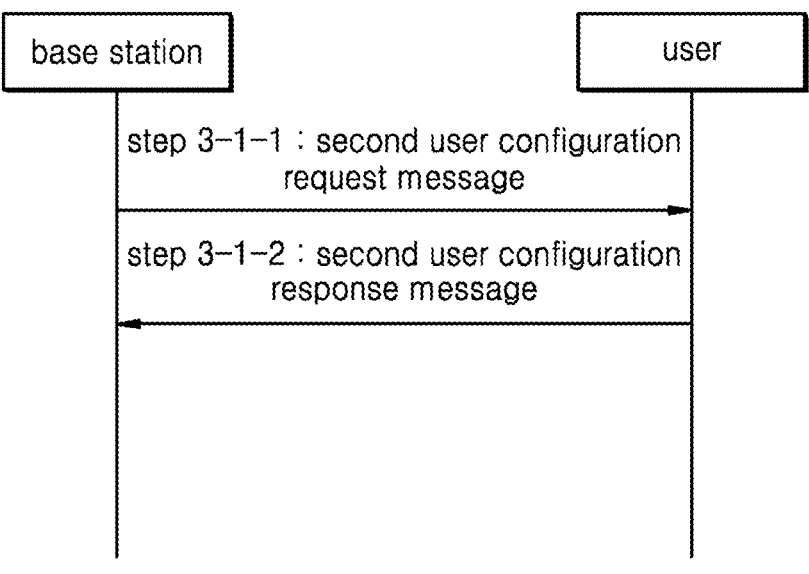
FIG. 9 is a schematic flowchart of an information transmission method in an optional embodiment of the present disclosure.

In addition, a third aspect of the present disclosure may include a procedure for a user to request configuration information for small data transmission from a structural entity (e.g., a third node or a fourth node) within the base station/of base station, thereby serving to request the base station to configure the user for small data transmission when the user is informed that there is small data to be transmitted. In one embodiment, the small data transmission occurs after that the user enters the Inactive status, and the procedure may occur before that the user enters the Inactive status, and as an optional embodiment, as shown in FIG. 9, the procedure may include the steps of following:

Step 3-1-1: the user transmits a second user configuration request message to the base station (e.g., a third node or a fourth node), which serves to request a transmission configuration for small data from the base station. In one embodiment, the small data transmission may be a configured grant based small data transmission, and the message may include at least one of the followings:

Indication information requesting the small data transmission configuration, the information serving to request configuration information used for the transmission of small data from the base station by the user. Upon receipt of the information, the base station transmits the configuration information used for the transmission of small data to the user;

Indication information for releasing the small data transmission configuration, the information serving to request release of configuration information used for the transmission of small data from the base station by the user. Upon receipt of the information, the base station releases the configuration information used for the transmission of small data by the user;

Configuration information for the requested small data transmission, which indicates configuration information related to the small data transmission requested by the user, that is, configuration information expected by the user for the transmission of small data, wherein the information comprises at least one of the followings:

Period of the requested data (traffic periodicity), indicating the requested (desired) period information for performing the small data transmission;

Timing offset of the requested data, indicating the requested timing offset for performing the small data transmission;

Logical channel identity of the requested data, indicating the logical channel of the small data for which the transmission is requested;

Logical channel group identity of the requested data, indicating the logical channel group of the small data for which transmission is requested;

Size of the requested data (message size), indicating information about the size of the small data for which transmission is requested;

Identity information of the requested radio bearer, indicating the radio bearer of the small data for which transmission is requested;

Identity information for PDU session, indicating a PDU session for the small data for which transmission is requested;

Identity information for a QoS flow, indicating a QoS flow for the small data for which transmission is requested;

Information about the number of occasion of the requested small data transmission, indicating information about the number of occasion of the small data transmission to be performed.

Step 3-1-2: the base station transmits a second user configuration response message to the user that serves to provide the user with configuration information used for the small data transmission. In one embodiment, the small data transmission may be a configured grant based small data transmission, and the message may include at least one of the followings:

Third configuration information related to configured grant, which serves to configure the resources (e.g., uplink resources, e.g., PUSCH) used by the user for the small data transmission, the content of information may be included in the preceding "configuration information related to configured grant" i.e., in the preceding "5) configuration information related to configured grant".

In the above procedure, the second user configuration request message may be an existing RRC message (e.g., a UL Information Transfer message) or a newly defined RRC message (e.g., a Configured Grant Request message), and the second user configuration response message can be an existing RRC message (e.g., RRC Release message in TS38.331 or RRC Connection Release message in TS36.331) or a newly defined RRC message (e.g., Configured Grant Configuration message).

The beneficial effect of the above procedure is that the user requests configuration information for small data transmission from the base station, thereby assisting the user with small data transmission.

Figure 10:
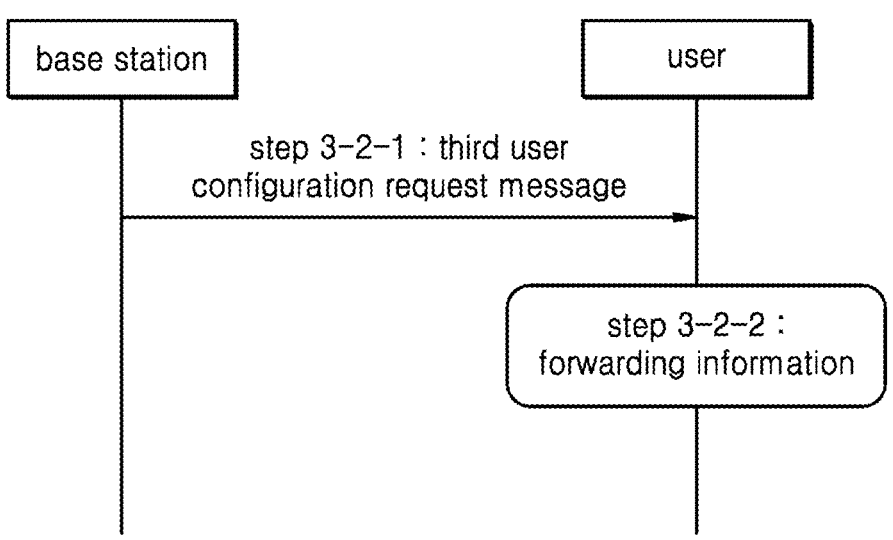
FIG. 10 is a schematic flowchart of an information transmission method in an optional embodiment of the present disclosure.

In addition, when the user performs the small data transmission, the user also provides the base station (e.g., the third node or the fourth node) with assistance information related to the small data, the information can help the base station perform the configuration of the small data transmission, so a third aspect of the present disclosure may also include the following procedure, as shown in FIG. 10:

Step 3-2-1: the user transmits a third user configuration request message to the base station, the message may be a control plane RRC message or a user plane packet, or may include both RRC message and user plane packet (e.g., a packet for small data), and the message serves to provide the base station with assistance information related to small data transmission, and the message includes at least one of the followings:

Fifth information related to the carried data; information related to the cache status; information related to more data transmission;

Fifth information related to carried data, wherein the data is transmitted by the user to the base station, or by the user to a distributed unit of the base station. The content of this fifth information can be found "information related to the carried data" in the previous section, i.e., "6) information related to the carried data" in the previous section;

Information related to the cache status, which serves to indicate the size of the data to be transmitted by the user, and the information may include at least one of the followings:

Buffer status report information that contains the size of the data to be transmitted by the user, such as the number of bits, the number of bytes, the number of packets, etc. In one embodiment, the information may be an index information, and further the index information indicates the size of the data to be transmitted by the user, such as 1 indicates that the size of data to be transmitted is less than or equal to 10 bytes, 2 indicates that the size of the data to be transmitted is less than or equal to 14 bytes, etc., and in one embodiment, the content contained in this information may refer to the BSR size in TS38.321 or TS36.321.

Logical channel identity information, which indicates the logical channel, such as Logical Channel ID, used by the user to transmit data (e.g., small data, or random access small data). In one embodiment, the information indicates the logical channel corresponding to the "cache status report information" described above, the logical channel used to transmit the data corresponding to the above-mentioned "buffer status report information". In another embodiment, the information indicates the logical channel on which the base station receives the buffer status report information from the user;

Logical channel group identity information that indicates the logical channel group, such as a Logical Channel ID, used by the user to transmit data (such as small data, or random access small data), the logical channel group indicated by the information may include one or more logical channels, and further, the information may include identity information of one or more logical channels included in the logical channel group. In one embodiment, the information indicates the logical channel group corresponding to the above-mentioned "cache status report information", i.e., the logical channel group used for transmitting the data corresponding to the above-mentioned "cache status report information". In another embodiment, the information indicates the logical channel group on which the base station receives the buffer status report from the user;

Indication information of logical channel, which serves to indicate whether the user transmits data on the respective logical channel. In one embodiment, the information may be a bitmap (bitmap) where each bit of the bitmap represents a logical channel, and the value of each bit indicates whether the user transmits data on the logical channel, such as "1" means that there is data, "0" means that there is no data, or "1" means that there is no data, "0" means that there is data. Further, in order to indicate the amount of data to be transmitted, the indication information may also be combined with the "cache status report information" described above to indicate the amount of data to be transmitted on the logical channel with data;

Indication information of logical channel group, which serves to indicate whether the user transmits data on each logical channel group, one logical channel group may contain one or more logical channels. In one embodiment, the information may be a bitmap where each bit of the bitmap represents a logical channel group, and the value of each bit indicates whether the user transmits data on the logical channel group, such as "1" for data, "0" for no data, or "1" for no data, "0" for data. Further, to indicate the amount of data to be transmitted, the indication information may also be combined with the "cache status report information" described above to indicate the amount of data to be transmitted on the logical channel group with data.

In one embodiment, the above "information related cache status" is information contained in the MAC layer control element transmitted by the user to the base station.

Information related to more data transmission, which serves to indicate whether the user has more data to transmit, either uplink or downlink data, or both uplink and downlink data, and the information includes at least one of the followings:

Indication information for more data transmission, indicating whether there are more data to transmit;

Indication information of logical channel for more data transmission, wherein the information serves to indicate a logical channel with more data transmission. In one embodiment, the information comprises identity information for one or more logical channels with more data transmission. In another embodiment, the information may be a bitmap, wherein each bit of the bitmap represents a logical channel, the value of each bit indicates whether the user has data to transmit on the logical channel, such as "1" for data, "0" for no data, or "1" for no data, and "0" for data;

Indication information of logical channel group with more data transmission, wherein the information serves to indicate a logical channel group with more data transmission. In one embodiment, the information comprises identity information for one or more logical channel groups with more data transmission. In another embodiment, the information may be a bitmap, wherein each bit of the bitmap represents a logical channel group, and the value of each bit indicates whether the user has data to transmit on the logical channel group, such as "1" for data, "0" for no data, or "1" for no data, "0" for data;

Indication information of radio bearer with more data transmission, wherein the information serves to indicate radio bearer with more data transmissions. In one embodiment, the information contains identity information for one or more radio bearers with more data transmission. In another embodiment, the information may be a bitmap, wherein each bit of the bitmap represents a radio bearer, and the value of each bit represents indicates whether the user has data to transmit on the radio bearer, such as "1" for data, "0" for no data, or "1" for no data, and "0" for data.

Indication information for PDU session with more data transmission, where the information serves to indicate PDU session with more data transmission. In one embodiment, the information contains identity information for one or more PDU sessions with more data transmission. In another embodiment, the information may be a bitmap, where each bit of the bitmap represents a PDU session, and the value of each bit indicates whether the user has data to transmit on the PDU session, such as "1" for data, "0" for no data, or "1" for no data, "0" for data;

Indication information for QoS flow with more data transmission, where the information serves to indicate QoS flow with more data transmission. In one embodiment, the information contains identity information for one or more QoS flows with more data transmission. In another embodiment, the information may be a bitmap, where each bit of the bitmap represents a QoS flow, and the value of each bit indicates whether the user has data to transmit on the QoS flow, such as "1" for data, "0" for no data, or "1" for no data, "0" for data;

In step 3-2-2, after receiving the information contained in the third user configuration request message, the base station may forward it to other base stations (e.g., the fourth node receives the above-mentioned information and forwards it to the third node). In another embodiment, after receiving the above-mentioned information, the distributed unit of the base station may forward it to the central unit of the base station, and then the central unit forwards it to other base stations (e.g., the central unit of the fourth node receives the above-mentioned information and forwards it to the third node).

The third user configuration request message in the above procedure may be an existing RRC message (e.g. UE Assistance Information message in TS36.331/TS38.331), a newly defined RRC message, or a user plane packet (optionally, the above information may be included in the MAC control information element of the packet).

The beneficial effect of the above procedure is that the base station can obtain information about the small data to be transmitted by the user and help the base station in the configuration of the small data transmission.

The above three aspects of the procedure of the present disclosure can be combined with each other to complete the transmission of small data, and several relevant embodiments are given below, and each of the following embodiments is still illustrated with the first data being small data and the first connection status being Inactive.

Embodiment a (the Procedure of This Embodiment May Occur Before that the User Enters the Inactive Status)

Figure 11:
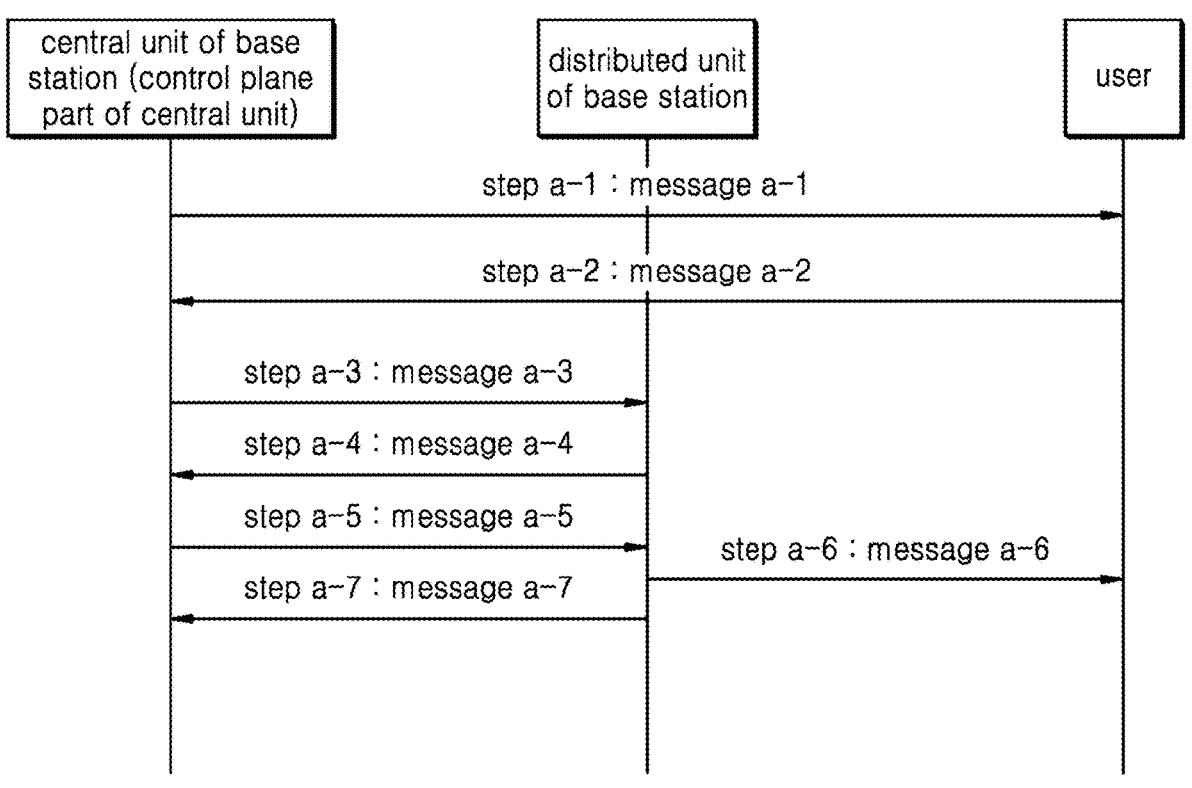
FIG. 11 is a schematic flowchart of an information transmission method in an optional embodiment of the present disclosure.

As shown in FIG. 11, this embodiment may occur between the central unit of the base station (or the control plane part of the central unit (which may also be referred to as the control plane entity)), the distributed unit of the base station, and the user, the base station in this embodiment is the first base station, and this embodiment may include the following steps:

Step a-1: the central unit of the base station (the control plane part of the central unit) transmits a message a-1 through the distributed unit of the base station to the user, i.e., the user device, the information contained in the message may refer to the first user configuration request message in step 3-1 above;

Step a-2: the user transmits a message a-2 via the distributed unit of the base station to the central unit (control plane part of the central unit) of the base station, the information contained in the message may refer to the first user configuration response message in step 3-2 above.

The purpose of the above two steps is: the user provides the base station with an assistance message to help configure the small data transmission, and in an optional embodiment, the message a-1 and message a-2 may be RRC Reconfiguration (or RRC Connection Reconfiguration in TS 36.331) message and UE Assistance Information message in TS38.331, respectively.

Step a-3: the central unit of the base station (or the control plane part of the central unit) transmits a message a-3 to the distributed unit of the base station, the contents of which may be found in the first data request message in step 1-1 above;

Step a-4: the distributed unit of the base station transmits a message a-4 to the central unit of the base station (the control plane part of the central unit), the content contained in the message can be referred to the first data response message in step 1-2 above.

The purpose of the above two steps is: the central unit (or the control plane part of the central unit) obtains configuration information related to small data transmission from the distributed unit, while the distributed unit may also obtain configuration information for small data transmission from the central unit (or the control plane part of the central unit), and in an optional embodiment, the message a-3 and the message a-4 may be F1AP UE Context Modification Request message and F1AP UE Context Modification Response message, respectively.

Step a-5: the central unit of the base station (the control plane part of the central unit) transmits a message a-5 to the distributed unit of the base station, the content contained in the message being referable to the first data request message in step 1-1 above;

Step a-6: the distributed unit of the base station transmits a message a-6 to the user, which serves to configure the user to enter the Inactive status, and the message may include an RRC Release message, and the message includes one of the followings:

Indication information indicating that the user enters the Inactive status;

Configuration information for small data transmission, such as configuration information for configured grant, the content of which refers to "configuration information related to configured grant" above;

Step a-7: the distributed unit of the base station transmits a message a-7 to the central unit (control plane part of the central unit) of the base station, the contents of which can be found in the first data response message in step 1-2 above;

The purpose of the three steps described above is to configure the user to the Inactive status and to provide the user with configuration information related to small data transmission. In an embodiment, the message a-5 and message a-7 may be an F1AP UE Context Release Command message and an F1AP UE Context Release Confirm message, respectively, and the message a-6 may be an RRCRelease message or other message.

In one embodiment, the above procedure may be used to configure the transmission of small data or to obtain configuration information required for the transmission of small data before that the user enters the Inactive status. Wherein, the small data transmission may be a configured grant based small data transmission or a random access based small data transmission.

Optionally, the information contained in message a-5 and message a-3 above are different or not identical in whole, and the information contained in message a-7 and message a-4 are different or not identical in whole. After receiving message a-3 from the central unit of the base station, the distributed unit of the base station may determine the content carried in message a-4 based on the content carried in message a-3, and similarly, the central unit of the base station may determine the content carried in message a-5 based on the content carried in message a-4, and the distributed unit of the base station then determines the content carried in message a-6 based on the content carried in message a-5.

It is also noted that the order between the various steps of the procedure of each optional embodiment provided in the present disclosure is not uniquely fixed, for example, there can be no clear sequence between step a-5 and step a-6 and between step a-6 and step a-7 in the procedure shown in FIG. 11.

Embodiment b (the Procedure of This Embodiment May Occur Before that the User Enters the Inactive Status)

Figure 12:
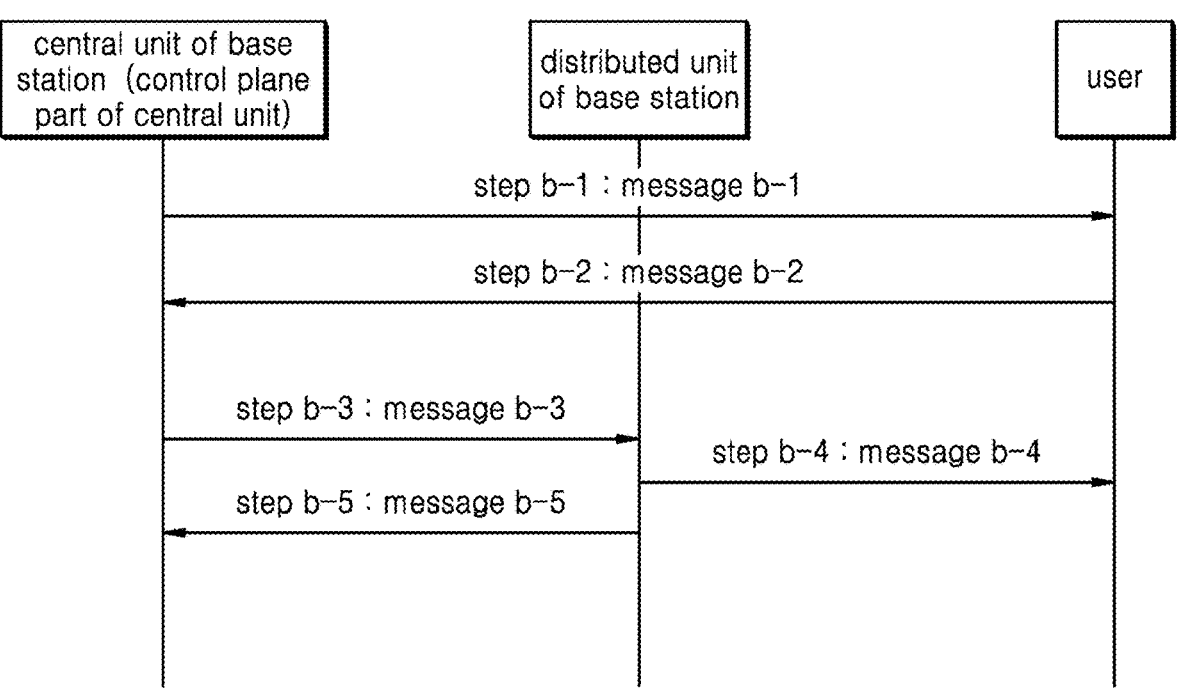
FIG. 12 is a schematic flowchart of an information transmission method in an optional embodiment of the present disclosure.

As shown in FIG. 12, this embodiment may occur among the central unit of the base station (or the control plane part of the central unit), the distributed unit of the base station, and the user, the base station in this embodiment is the first base station, and this embodiment may include the following steps:

Step b-1: the central unit of the base station (the control plane part of the central unit) transmits a message b-1 through the distributed unit of the base station to the user, the information contained in the message may refer to the first user configuration request message in step 3-1 above;

Step b-2: the user transmits a message b-2 via the distributed unit of the base station to the central unit (control plane part of the central unit) of the base station, the information contained in the message may refer to the first user configuration response message in step 3-2 above.

The purpose of the above two steps is: the user provides the base station with an assistance message to help configure the small data transmission, and in an embodiment, the message b-1 and message b-2 may be RRC Reconfiguration (or RRC Connection Reconfiguration in TS 36.331) message and UE Assistance Information message in TS38.331, respectively.

Step b-3: the central unit of the base station (or the control plane part of the central unit) transmits a message b-3 to the distributed unit of the base station, the contents of which may be found in the first data request message in step 1-1 above;

Step b-4: the distributed unit of the base station transmits a message a-4 to the user, which serves to configure the user to enter the Inactive, and the message may include an RRC Release message, and the message includes one of the followings:

Indication information indicating that the user enters the Inactive status;

Configuration information for small data transmission, such as configuration information for configured grant, the content of which refers to "configuration information related to configured grant" above;

Step b-5: the distributed unit of the base station transmits a message b-5 to the central unit (control plane part of the central unit) of the base station, the contents of which can be found in the first data response message in step 1-2 above;

The purpose of the three steps described above is to configure the user to the Inactive and to provide the user with configuration information related to small data transmission. In an embodiment, the message b-3 and message b-5 may be an F1AP UE Context Release Command message and an F1AP UE Context Release Confirm message, respectively, and the message b-4 may be an RRCRelease message.

In one embodiment, the above procedure may be used to configure the transmission of small data or to obtain configuration information required for the transmission of small data before that the user enters the Inactive status. Wherein, the small data transmission may be a configured grant based small data transmission or a random access based small data transmission.

As can be seen from the embodiment shown in FIG. 11 and the embodiment shown in FIG. 12 above, when the central unit of the base station interacts information with the distributed unit of the base station, the information to be interacted between the two can be implemented in a variety of different ways, such as in FIG. 11 by step a-3, step a-4, step a-5 and step a-7 for multiple interactions, or as shown in FIG. 12 by steps b-3 and b-5 for interaction. It is understood that for different interactions, the information carried in different messages can be different, such as not identical or completely different, for example, the contents contained in message a-3, message a-5 and message b-3 can be different, and the contents contained in message a-3 and message b-3 can be the same or different, and similarly, the contents contained in message a-5 and message b-3 can be the same and can also be different.

Embodiment c (the Procedure of This Embodiment May Occur After that the User Enters the Inactive Status, for Small Data Transmission at a New Base Station (Second Base Station), and the New Base Station is not Same as the Last Serving Base Station, i.e., the First Base Station)

Figure 13:
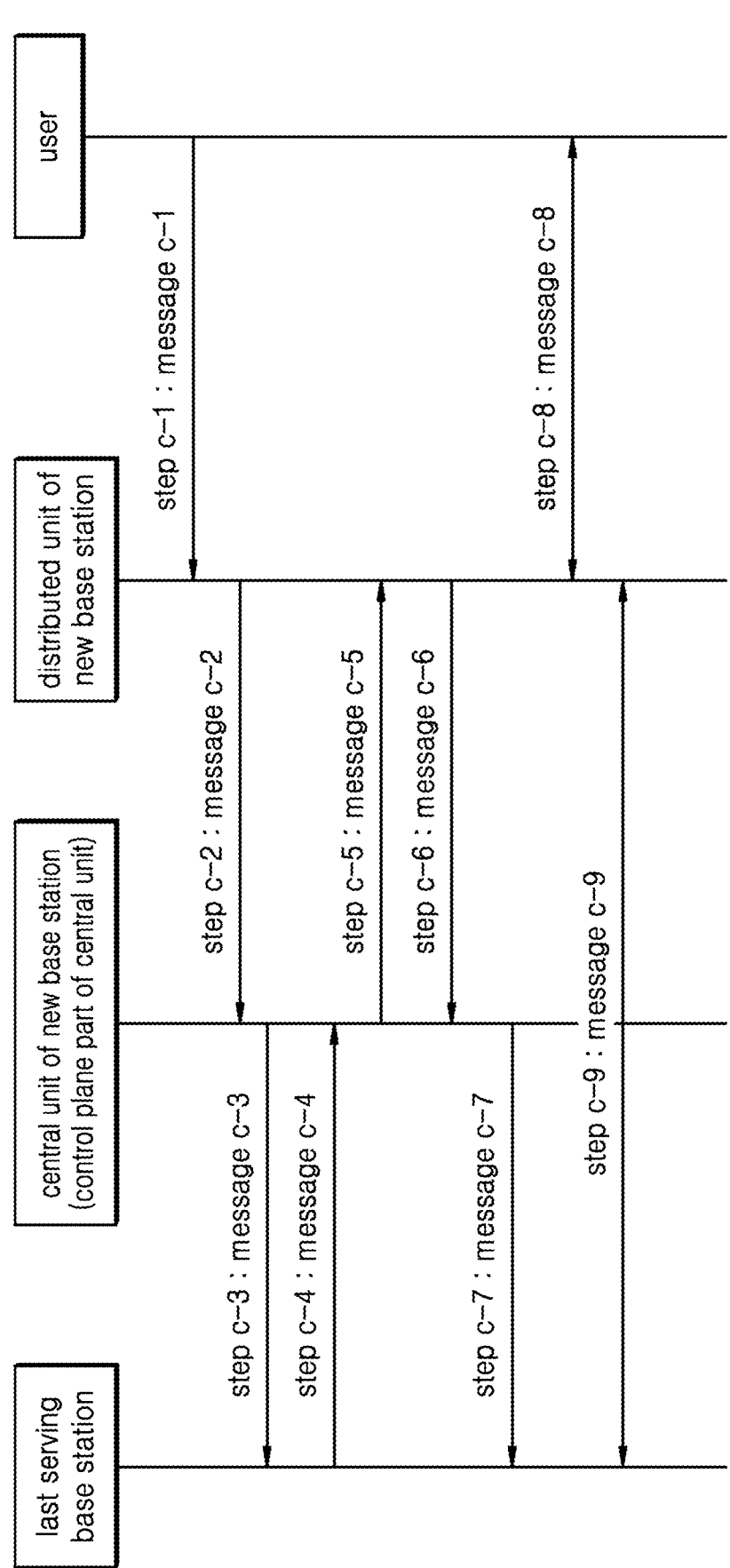
FIG. 13 is a schematic flowchart of an information transmission method in an optional embodiment of the present disclosure.

In this embodiment, the user in Inactive status performs the transmission of small data at the new base station, which requires user context fetch between the new base station and the last serving base station, as in FIG. 13, and the procedure of this embodiment may include the following steps:

Step c-1: the user transmits a message c-1 to the distributed unit of the new base station, the information contained in this message may refer to the third user configuration request message in step 3-2-1 above, or, the RRC resume request message and/or the packet of small data in step 1-1-1;

Step c-2: the distributed unit of the new base station transmits a message c-2 to the central unit (or the control plane portion of the central unit) of the new base station, the information contained in the message may refer to the second data request message in step 1-1-2 above;

According to the above two steps, the central unit of the new base station may be informed that the user initiates RRC resume procedure or initiates small data transmission. In one embodiment, the above message c-2 may be an F1AP Initial UL RRC Message Transfer message, or may be another message or a new F1AP message.

Step c-3: the central unit (or the control plane part of the central unit) of the new base station transmits a message c-3 to the last serving base station, the information contained in this message may refer to the first configuration request message in step 2-1 above;

Step c-4: the last serving base station transmits a message c-4 to the central unit of the new base station, the information contained in this message may refer to the first configuration response message in step 2-2 above.

The function of the above two steps is: the new base station obtains the user's context from the last base station (the last serving base station), but the last base station decides not to transfer all user's context thereof to the new base station (i.e., no UE Context Relocation), i.e., the last base station does not provide the user's context to the new base station. In this procedure, in order to support small data transmission, the last serving base station provides configuration information related to small data transmission to the new base station. In an embodiment, the above message c-3 and message c-4 may be Retrieve UE Context Request message and Retrieve UE Context Failure message, respectively, or may be new messages.

Step c-5: the central unit of the new base station (the control plane part of the central unit) transmits a message c-5 to the distributed unit of the new base station, the information contained in the message may refer to the first data request message in step 1-1 above;

Step c-6: the distributed unit of the base station transmits a message c-6 to the central unit (control plane part of the central unit) of the base station, the information contained in the message being referable to the first data response message in step 1-2 above.

The purpose of the two steps described above is to perform configuration related to small data transmission between the central unit and the distributed unit of the new base station. In one embodiment, the above message c-5 and message c-6 may be F1AP UE Context Setup Request message and F1AP UE Context Setup Response message, respectively, or may be F1AP UE Context Modification Request message and F1AP UE Context Modification Response message, or other messages or newly defined message.

Step c-7: the central unit of the new base station (the control plane part of the central unit) transmits a message c-7 to the last serving base station, the contents of which can be found in the first configuration confirmation message in steps 2-3 above.

The purpose of this step is: the new base station provides configuration information related to small data transmission to the last serving base station. In one embodiment, the above message c-7 may be Xn-U Address Indication message or X2-U Address Indication message, or may be a new message.

Step c-8: transmission of small data is performed between the user and the distributed unit of the new base station;

Step c-9: the distributed unit of the new base station transmits small data with the last serving base station.

The purpose of the above two steps is to enable the small data transmission between the user and the last serving base station, in which the small data needs to pass through the distributed unit of the new base station.

In one embodiment, the above procedure can be used to configure the transmission of small data after that the user enters the Inactive status. Specifically, the small data transmission may be configured grant based small data transmission or random access based small data transmission.

Further, in one embodiment, steps c-1 to c-7 in the above procedure can be used to perform the configuration of the all small data transmission. Optionally, there may be no packets containing small data in step c-1 or only a small number of packets containing small data (there are more packets that need to be transmitted via step c-8/c-9), but the transmission of all small data are configured by steps c-2 to c-7. In another implementation, the above procedure is performed based on the small data packets received by the distributed unit of the new base station, e.g., step c-1 contains one type of small data (e.g., a packet for a small data radio bearer, or a packet for a small data PDU session, or a packet for a small data QoS flow, or a packet for a logical channel carrying small data, or a packet for a logical channel group carrying small data), then steps c-2~c-7 can be used to configure the transmission of only one type of small data. If a new type of small data packet is received in step c-1, steps c-2~c-7 can be executed again to configure the transmission of the new type of small data, and so on. And the packets transmitted in steps c-8-~c-9 are packets of already configured small data.

Also, each of the steps in embodiments a, b, and c above is optional step, and some or all of them may be performed in an actual network.

The optional embodiments provided in the above three aspects of the present disclosure may have at least the following beneficial effects:

Based on the first aspect, the beneficial effects may include:

The first node interacts the configuration information of the user with the second node, thereby generating the configuration information used by the user for data (e.g., small data) transmission. Optionally, the beneficial effect may occur before that the user enters the Inactive status;

The first node interacts the configuration information of the user with the second node, for configuring the two nodes to perform the transmission of small data of the user. Optionally, the beneficial effect may occur during the user performs the transmission of small data;

Decoding and transmission of user data may be performed between the first node and the second node, and the decoded data is transmitted to the core network.

Based on the second aspect, the beneficial effects may include:

Configuration information of the user may be interacted between the third node and the fourth node, thereby helping the third node decide whether to transfer the user's context to the fourth node, and also helping the fourth node obtain configuration information required for user data (e.g., small data) transmission.

Based on the third aspect, beneficial effects may include:

The base station may obtain information about the feature of the data (e.g., small data) on the user side, thereby helping the base station to generate configuration information related to the data transmission;

The user may request configuration information related to the transmission of data (e.g., small data) from the base station;

The user may provide assistance information to the base station to help determine the configuration of the data (e.g., small data) to be transmitted.

Based on the same principle, the present disclosure provides an information transmission method, comprising:

transmitting a first message and/or receiving a second message, to transmit a first data based on a resource configuration corresponding to the first message and/or the second message, the first message and the second message including information about the first data, wherein, the first data is data to be transmitted when a user device is in a first connection status;

Optionally, transmission of the first data comprises at least one of the followings:

transmission of the first data based on the resource configuration;

initiating a random access request message, to transmit the first data based on the resource configuration.

It will be understood that this embodiment is a description of this disclosed solution from the perspective of different performing objects (the two ends where the information interaction occurs), which in essence is the same as the substance of the information transmission method described previously, e.g., when the information transmission method occurs between a user device and a network node, the performing object in the previous text may be a user device, while the performing object in this embodiment is a network node. The substance of the method content is same at both ends, and for various optional implementations of the embodiment, the respective optional implementations in the preceding text are referred, which will not be repeatedly described herein.

Corresponding to the data transmission method provided by embodiments of the present disclosure, the present disclosure also provides a data transmission apparatus that may be configured in a user device, the apparatus comprises a communication module that may be configured to:

before entering a first connection status, acquire a resource configuration information corresponding to a first data, to transmit the first data based on the resource configuration information after entering the first connection status;

initiate a random access request message, to transmit the first data based on a random access procedure;

wherein, the first connection status is a non-connected status, and the first data is data to be transmitted when a user device is in the first connection status.

Optionally, the communication module may be configured to: transmit the RRC Resume request message and transmit the first data based on the RRC Resume procedure.

Optionally, the communication module may be configured to:

transmit the RRC Resume request message and the first data at the same time;

transmit the RRC Resume request message and the first data separately;

transmit the first data after transmitting the RRC Resume request message;

transmit the RRC Resume request message and receiving the first data.

Optionally, the first data comprises small data, wherein the small data is data that satisfies at least one of the followings:

data whose size of the data packet is less than or equal to a first size;

data whose transmission period is less than or equal to a first period;

a first type of data.

The present disclosure provides a data transmission apparatus configured in the network node, comprising a communication module configured to:

before entering a first connection status, transmit a resource configuration information corresponding to a first data to a user device, to transmit the first data based on the resource configuration information after entering the first connection status by the user device;

receive a random access request message transmitted by the user device, to transmit the first data based on a random access procedure;

wherein, the first data is data to be transmitted when the user device is in the first connection status.

In another aspect, the present disclosure further provides a data transmission apparatus that may be configured in a user device, the apparatus comprises a communication module that may be configured to:

acquire a resource configuration information corresponding to a first data, to transmit the first data based on the resource configuration information, and/or, initiate a random access request message, to transmit the first data based on the resource configuration information;

wherein, the first data is data to be transmitted when a user device is in the first connection status, and the first connection status is a non-connected status.

The present disclosure further provides a data transmission apparatus that may be configured in a network node, the apparatus comprises a communication module that may be configured to:

transmit a resource configuration information corresponding to a first data, to transmit the first data based on the resource configuration information by a user device, and/or, initiate a random access request message, to transmit the first data based on the resource configuration information;

wherein, the first data is data to be transmitted when the user device is in the first connection status, and the first connection status is a non-connected status.

Corresponding to the information transmission method in the disclosure, the disclosure further provides an information transmission apparatus, the information transmission apparatus comprising a communication module configured to:

receiving a first message and/or transmitting a second message, to transmit a first data based on a resource configuration corresponding to the first message and/or the second message, the first message and the second message including information about the first data, wherein, the first data is data to be transmitted when a user device is in a first connection status, the first connection status is a non-connected status;

Optionally, transmission of the first data comprises at least one of the followings:

transmission of the first data based on the resource configuration;

initiating a random access request message, to transmit the first data based on the resource configuration.

Optionally, the apparatus may be configured in the user device, the first message comprises a third message and/or a fourth message, the second message comprises a fifth message and/or a sixth message;

Third message for configuring the user device with information related to the first data transmission;

Fourth message providing the user device with transmission configuration information related to the first data;

Fifth message for providing information related to the transmission of the first data;

Sixth message for requesting the transmission configuration information for the first data.

Optionally, the communication module may be configured to:

receive a third message transmitted by the first network node, in response to the third message, transmitting a fifth message to the first network node;

transmitting a sixth message to the second network node to receive a fourth message transmitted by the second network node, the fourth message being a response message to the sixth message;

transmitting a fifth message to a third network node to transmit the fifth message to a fourth network node via the third network node.

Optionally, the first network node, the second network node, the third network node, or the fourth network node comprises at least one of the followings:

First base station; central unit or distributed unit of the first base station; user plane entity or control plane entity of the central unit of the first base station; second base station; central unit or distributed unit of the second base station; user plane entity or control plane entity of the central unit of the second base station;

The first base station is a serving base station before that the user device enters the first connected status, and the second base station is a serving base station after that the user device enters the first connected status.

Optionally, the apparatus may be configured in the fifth network node, and the communication module described above may be configured to: transmit a second message to the sixth network node and/or receive a first message from the sixth network node, the second message for providing configuration information related to first data transmission, and/or, for requesting configuration information related to first data transmission, the first message for providing configuration information related to the first data transmission to the fifth network node.

Optionally, the fifth network node and the sixth network node are any of the followings:

Sixth network node is a distributed unit of the first base station, and the fifth network node is a central unit of the first base station or a control plane entity of a central unit of the first base station;

Sixth network node is a distributed unit of a second base station, and the fifth network node is a central unit of the second base station or a control plane entity of a central unit of the second base station;

Fifth network node is a second base station, a central unit of the second base station, a user plane entity of a central unit of the second base station, a control plane entity of a central unit of the second base station, or a distributed unit of the second base station, and the sixth network node is a first base station, a central unit of the first base station, a user plane entity of a central unit of the first base station, a control plane entity of a central unit of the first base station, or a distributed unit of the first base station;

Fifth network node is a core network node and the sixth network node is any of the followings:

First base station, a central unit of the first base station, a user plane entity of a central unit of the first base station, a control plane entity of a central unit of the first base station, a distributed unit of the first base station, a second base station, a central unit of the second base station, a user plane entity of a central unit of the second base station, a control plane entity of a central unit of the second base station, or a distributed unit of the second base station;

The first base station is a serving base station before that the user device enters the first connected status, and the second base station is a serving base station after that the user device enters the first connected status.

Optionally, the above communication module, when transmitting the second message to the sixth network node and/or receiving the first message from the sixth network node, may be configured to:

transmit second message to the sixth network node;

receive the first message transmitted by the sixth network node, wherein the first message is a response message to the second message.

Optionally, the above communication module is further used to: transmit a seventh message to the sixth network node, the seventh message being used to provide configuration information related to the first data transmission.

Optionally, the fifth network node and the sixth network node are structural entities of the second base station, and the above communication module is further used to:

receive an eighth message from the sixth network node, wherein the eighth message is used to request configuration information related to the first data from the fifth network node, the eighth message being transmitted by the sixth network node upon receipt of the data transmission indication information from the user device;

transmit, in response to the eighth message, a ninth message to the sixth network node.

Corresponding to the information transmission method, the disclosure further provides an information transmission apparatus comprising a communication module that is configured to:

transmit a first message and/or receive a second message, to transmit a first data based on a resource configuration corresponding to the first message and/or the second message, the first message and the second message including information about the first data, wherein, the first data is data to be transmitted when a user device is in a first connection status, and the first connection status is a non-connected status.

Optionally, transmission of the first data comprises at least one of the followings:

transmission of the first data based on the resource configuration;

initiating a random access request message, to transmit the first data based on the resource configuration.

The present disclosure also provides an electronic device including at least one processor configured to execute the method provided in any of optional embodiments of the present disclosure.

The present disclosure also provides a computer readable medium storing computer programs thereon, which can achieve the method in any of optional embodiments of the present disclosure upon performing. The embodiments of the disclosure provide an electronic device, comprising: memory and processor; at least one programs configured to store in the memory, for performing by the processor.

Figure 14:
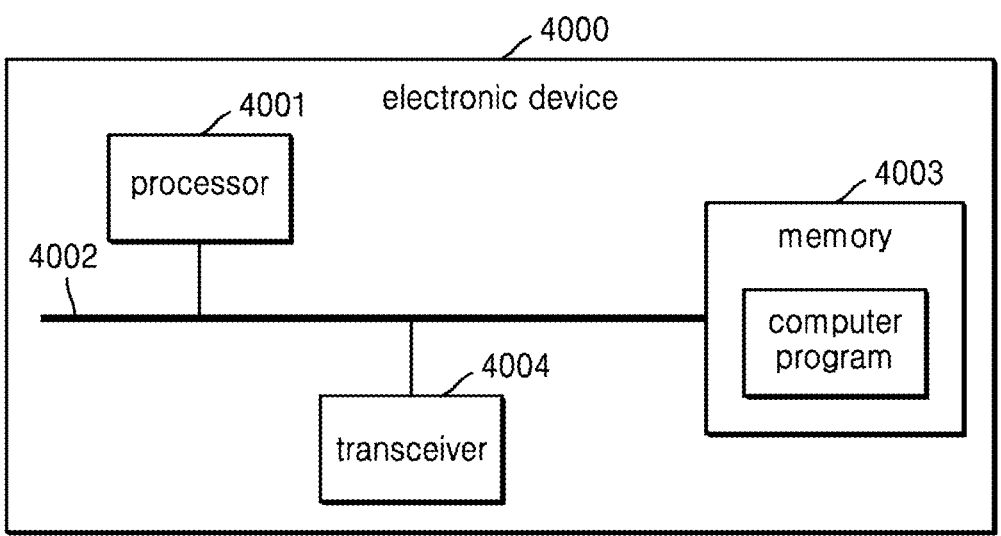
FIG. 14 is a schematic structural diagram of an electronic device according to an embodiment of the disclosure.

In an optional embodiment, an electronic device is provided, as shown in FIG. 14. The electronic device 4000 shown in FIG. 14 comprises a processor 4001 and a memory 4003. The processor 4001 is connected to the memory 4003, for example, via a bus 4002. Optionally, the electronic device 4000 can further comprise a transceiver 4004. It is to be noted that, in practical applications, the number of the transceiver 4004 is not limited to 1, and the structure of the electronic device 4000 also does not constitute any limitations to the embodiments of the present application.

The processor 4001 can be a central processing unit (CPU), a general-purpose processor, a digital signal processor (DSP), an application specific integrated circuit (ASIC), a field programmable gate array (FPGA) or other programmable logic devices, a transistor logic device, a hardware component or any combination thereof. The processor can implement or execute various exemplary logic blocks, modules and circuits described in the contents of the present application. The processor 4001 can also be a combination for realizing a computation function, for example, a combination of one or more microprocessors, a combination of DSPs and microprocessors, etc.

The bus 4002 can comprise a passageway for transferring information between the above components. The bus 4002 can be a peripheral component interconnect (PCI) bus, an extended industry standard architecture (EISA) bus, etc. The bus 4002 can be classified into an address bus, a data bus, a control bus or the like. For ease of representation, the bus is represented by only one bold line in FIG. 14, but it does not mean that there is only one bus or one type of buses.

The memory 4003 may be, but not limited to, a read only memory (ROM) or other types of static storage devices capable of storing static information and instructions, a random access memory (RAM) or other types of dynamic storage devices capable of storing information and instructions, or an electrically erasable programmable read only memory (EEPROM), compact disc read only memory (CD-ROM) or other optical disk storages, optical disc storages (including compact disc, laser disc, optical disc, digital versatile optical disc, Blu-ray disc, etc.), magnetic disk storage media or other magnetic storage devices, or any other media that can be used to carry or store desired program codes in form of instructions or data structures and can be accessed by a computer.

The memory 4003 is configured to store application codes for executing the solutions in the present application and is controlled by the processor 4001. The processor 4001 is configured to execute the application codes stored in the memory 4003 to implement the contents in the above method embodiments.

It should be understood that, although the steps in the flowcharts in the accompanying drawings are described successively in an order indicated by the arrows, those steps may not be successively executed in the order indicated by the arrows. Unless otherwise stated, the execution of those steps is not limited to a specific order and they may be executed in other orders. Moreover, at least some of the steps in the flowcharts shown in the drawings may include multiple sub-steps or multiple stages. These sub-steps or stages are not necessarily performed at the same moment of time, and instead, may be performed at different moments of time. The sub-steps or stages are not necessarily performed sequentially, and instead, may be performed in turn or alternately with other steps or at least some of the sub-steps or stages of other steps.

The above described is only a partial implementation of the present invention, and it should be noted that for a person of ordinary skill in the art, several improvements and embellishments can be made without departing from the principles of the present invention, and these improvements and embellishments should also be considered as the scope of protection of the present invention.

The invention claimed is:

1. A method performed by a first node in a wireless communication system, the method comprising:

transmitting, to a second node, an user equipment (UE) context modification request message including a request indication for configuration information for configured grant (CG)-small data transmission (SDT) or SDT bearer configuration;

receiving, from the second node, an UE context modification response message including configuration information for SDT related with CG based on the request indication; and transmitting, to the second node, an UE context release command message for an UE entering radio resource control (RRC) inactive state, wherein the UE context release command message includes an indication information indicating not to release information related to at least one of SDT RLC configuration or tunnel of a SDT bearer.

2. The method of claim 1, wherein the UE context modification request message further includes identity information of a radio bearer and indication information of small data.

3. The method of claim 2, wherein in case that the request indication for the configuration information for CG-SDT is included in the UE context modification request message, the UE context modification response message includes at least one of time alignment timer for configured grant, or configuration of physical uplink shared channel (PUSCH), and wherein in case that the request indication for the SDT bearer configuration is included in the UE context modification request message, the UE context modification response message, includes radio link control (RLC) bearer configuration for SDT bearer including at least one of bearer identity, logical channel identity, RLC configuration information, or logical channel configuration information.

4. The method of claim 1, wherein the first node is a central unit of a base station or control plane entity of the central unit of the base station and the second node is a distributed unit of the base station.

5. A first node in a wireless communication system, the first node comprising:

at least one transceiver; and at least one processor connected to the transceiver, wherein the at least one processor is configured to:

transmit, to a second node, an user equipment (UE) context modification request message including a request indication for configuration information for configured grant (CG)-small data transmission (SDT) or SDT bearer configuration, receive, from the second node, an UE context modification response message including configuration information for SDT related with CG, based on the request indication, and transmit, to the second node, an UE context release command message for an UE entering radio resource control (RRC) inactive state, wherein the UE context release command message includes indication information indicating not to release information related to at least one of SDT RLC configuration or tunnel of a SDT bearer.

6. The first node of claim 5, wherein the UE context modification request message further includes identity information of a radio bearer and indication information of small data.

7. The first node of claim 6, wherein in case that the request indication for the configuration information for CG-SDT is included in the UE context modification request message, the UE context modification response message includes at least one of time alignment timer for configured grant, or configuration of physical uplink shared channel (PUSCH), and wherein in case that the request indication for the SDT bearer configuration is included in the UE context modification request message, the UE context modification response message, includes radio link control (RLC) bearer configuration for SDT bearer including at least one of bearer identity, logical channel identity, RLC configuration information, and logical channel configuration information.

8. A method performed by a second node in a wireless communication system, the method comprising:

receiving, from a first node, an user equipment (UE) context modification request message including a request indication for configuration information for configured grant (CG)-small data transmission (SDT) or SDT bearer configuration;

transmitting, to the first node, an UE context modification response message including configuration information for SDT related with CG, based on the request indication; and receiving, from the first node, an UE context release command message for an UE entering radio resource control (RRC) inactive state, wherein the UE context release command message includes indication information indicating not to release information related to at least one of SDT RLC configuration or tunnel of a SDT bearer.

9. The method of claim 8, wherein the UE context modification request message further includes identity information of a radio bearer and indication information of small data.

10. The method of claim 9, wherein in case that the request indication for the configuration information for CG-SDT is included in the UE context modification request message, the UE context modification response message includes at least one of time alignment timer for configured grant, or configuration of physical uplink shared channel (PUSCH), and wherein in case that the request indication for the SDT bearer configuration is included in the UE context modification request message, the UE context modification response message, includes radio link control (RLC) bearer configuration for SDT bearer including at least one of bearer identity, logical channel identity, RLC configuration information, and logical channel configuration information.

11. A second node in a wireless communication system, the second node comprising:

at least one transceiver; and at least one processor connected to the transceiver, wherein the at least one processor is configured to:

receive, from a first node, an user equipment (UE) context modification request message including a request indication for configuration information for confugured grant (CG)-small data transmission (SDT) or SDT bearer configuration, transmit, to the first node, an UE context modification response message including configuration information for SDT related with CG, based on the request indication, and receive, from the first node, an UE context release command message for an UE entering radio resource control (RRC) inactive state, wherein the UE context release command message includes indication information indicating not to release information related to at least one of SDT RLC configuration or tunnel of a SDT bearer.

12. The second node of claim 11, wherein the UE context modification request message further includes identity information of a radio bearer and indication information of small data.

13. The second node of claim 11, wherein the at least one processor is further configured to configure, to the UE, threshold information indicating a threshold for amount of small data.

* * * * *